(12) United States Patent
Brueckner

(10) Patent No.: US 12,523,611 B2
(45) Date of Patent: Jan. 13, 2026

(54) METHOD AND SYSTEM FOR ACQUIRING CARS SPECTRUM

(71) Applicant: ATONARP INC., Tokyo (JP)

(72) Inventor: Lukas Brueckner, Nieder-Olm (DE)

(73) Assignee: ATONARP INC., Tokyo (JP)

( * ) Notice: Subject to any disclaimer, the term of this patent is extended or adjusted under 35 U.S.C. 154(b) by 107 days.

(21) Appl. No.: 18/698,201

(22) PCT Filed: Oct. 6, 2022

(86) PCT No.: PCT/JP2022/037421
§ 371 (c)(1),
(2) Date: Apr. 3, 2024

(87) PCT Pub. No.: WO2023/058710
PCT Pub. Date: Apr. 13, 2023

(65) Prior Publication Data
US 2024/0328951 A1    Oct. 3, 2024

Related U.S. Application Data

(60) Provisional application No. 63/252,775, filed on Oct. 6, 2021.

(51) Int. Cl.
*G01J 3/44* (2006.01)
*G01N 21/65* (2006.01)

(52) U.S. Cl.
CPC ....... *G01N 21/65* (2013.01); *G01N 2021/653* (2013.01); *G01N 2201/0636* (2013.01)

(58) Field of Classification Search
CPC ............. G01N 21/65; G01N 2021/653; G01N 2201/0636; G01N 2201/105; G01J 3/44
See application file for complete search history.

(56) References Cited

U.S. PATENT DOCUMENTS

| 7,388,668 B2 | 6/2008 | Potma et al. |
| 2005/0280827 A1 | 12/2005 | Potma et al. |

(Continued)

FOREIGN PATENT DOCUMENTS

| CN | 103344623 A | * 10/2013 | |
| JP | 2012521001 A | * 9/2012 | ............... G01J 3/02 |

(Continued)

OTHER PUBLICATIONS

International Search Report (PCT/ISA/210) and Written Opinion (PCT/ISA/237) mailed on Dec. 20, 2022, by the Japan Patent Office as the International Searching Authority for International Application No. PCT/JP2022/037421. (6 pages).

*Primary Examiner* — Abdullahi Nur
(74) *Attorney, Agent, or Firm* — BUCHANAN INGERSOLL & ROONEY PC

(57) ABSTRACT

A system includes an optical path configured to irradiate a part of a target with Stokes light pulses, pump light pulses and hybrid probe light pulses including first probe light pulses and second light pulses, with the first probe light pulses and the second probe light pulses overlapping in time in part, with the first and second probe light pulses partially overlapping with the Stokes pulse and the pump pulse, and with at least one of the first probe light pulses and the second probe light pulses varying phases; and a detector configured to detect CARS spectrum and generated by the Stokes light pulses, the pump light pulses and the hybrid probe light pulses to acquire sets of CARS spectrum in association with the phases of the hybrid probe light pulses.

22 Claims, 14 Drawing Sheets

(56) References Cited

U.S. PATENT DOCUMENTS

| | | | |
|---|---|---|---|
| 2010/0027000 A1* | 2/2010 | Pestov | G01J 3/44 |
| | | | 356/301 |
| 2019/0154583 A1 | 5/2019 | Hirai | |
| 2021/0218215 A1 | 7/2021 | Misawa et al. | |
| 2022/0087530 A1 | 3/2022 | Brueckner et al. | |

FOREIGN PATENT DOCUMENTS

| | | |
|---|---|---|
| WO | 2005124322 A1 | 12/2005 |
| WO | 2020222300 A1 | 11/2020 |
| WO | 2020222330 A1 | 11/2020 |

\* cited by examiner

[Fig. 1]
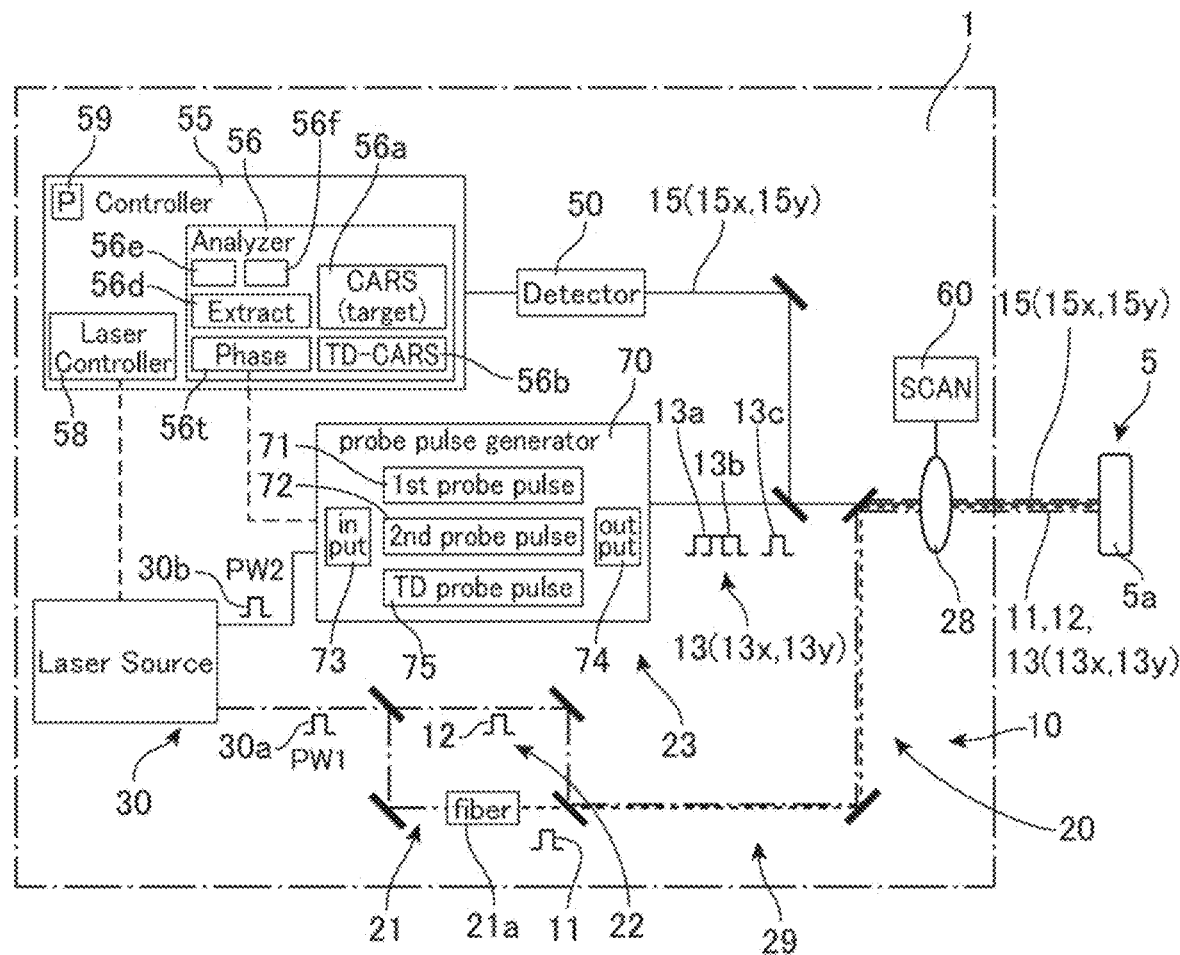

[Fig. 2]
(a) 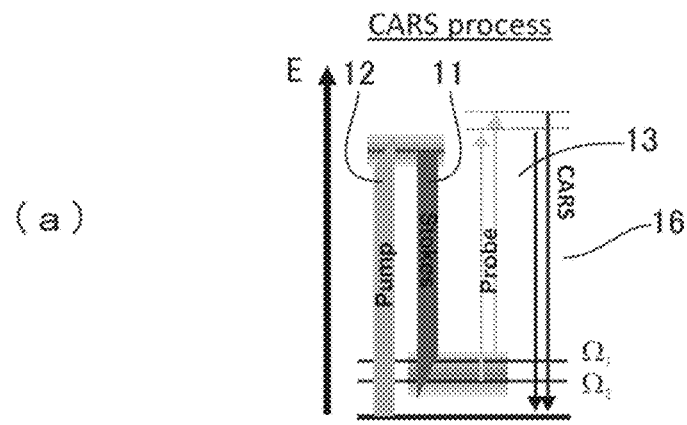
(b) 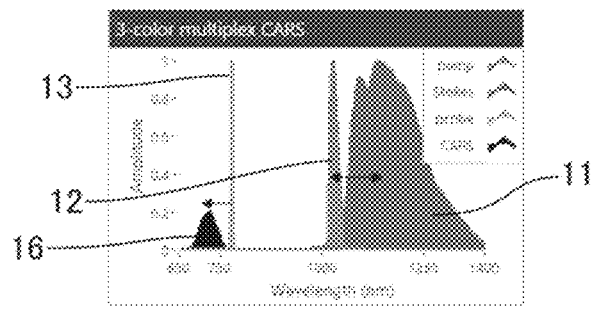
(c) 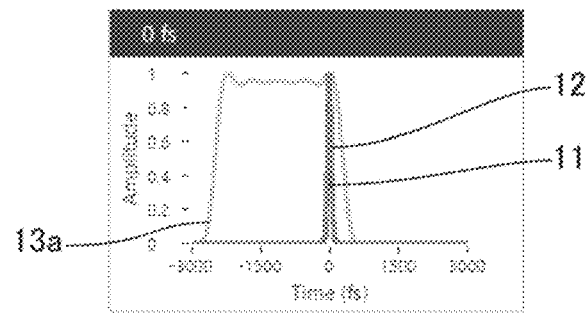
(d) 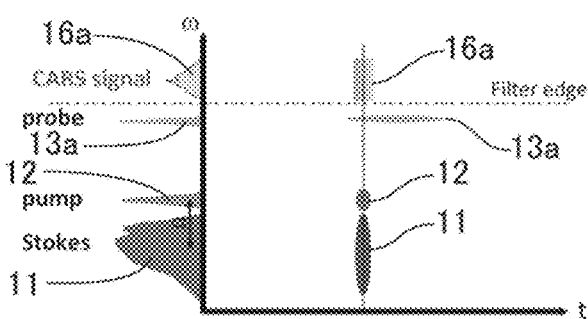

[Fig. 3]
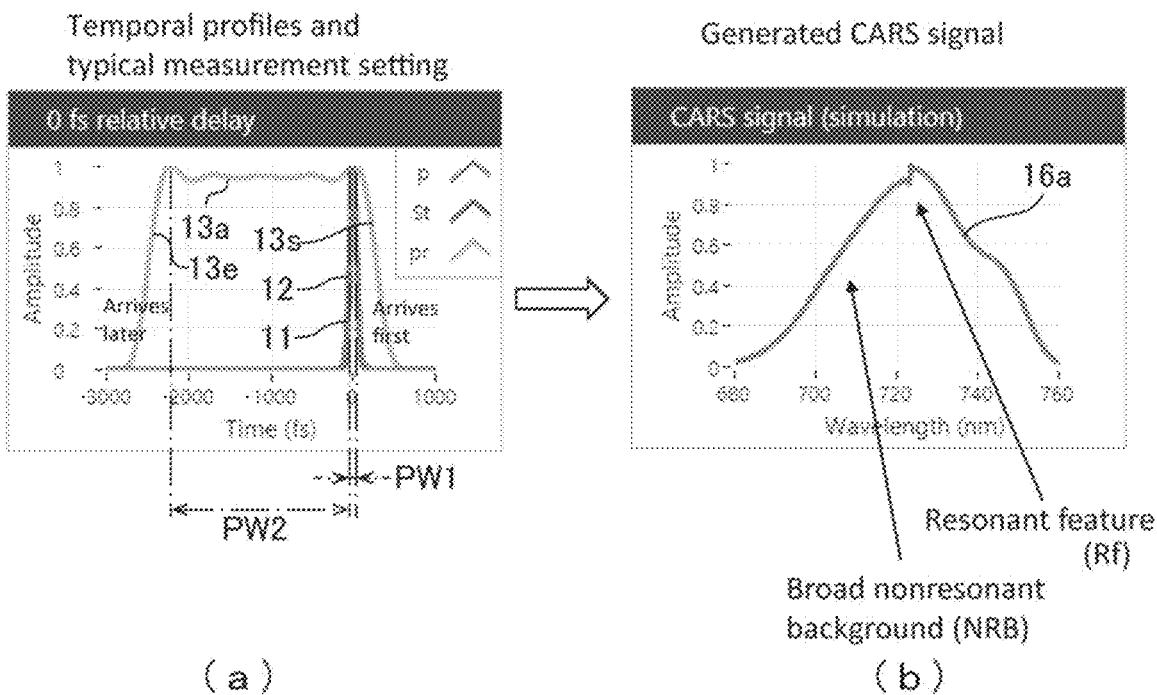

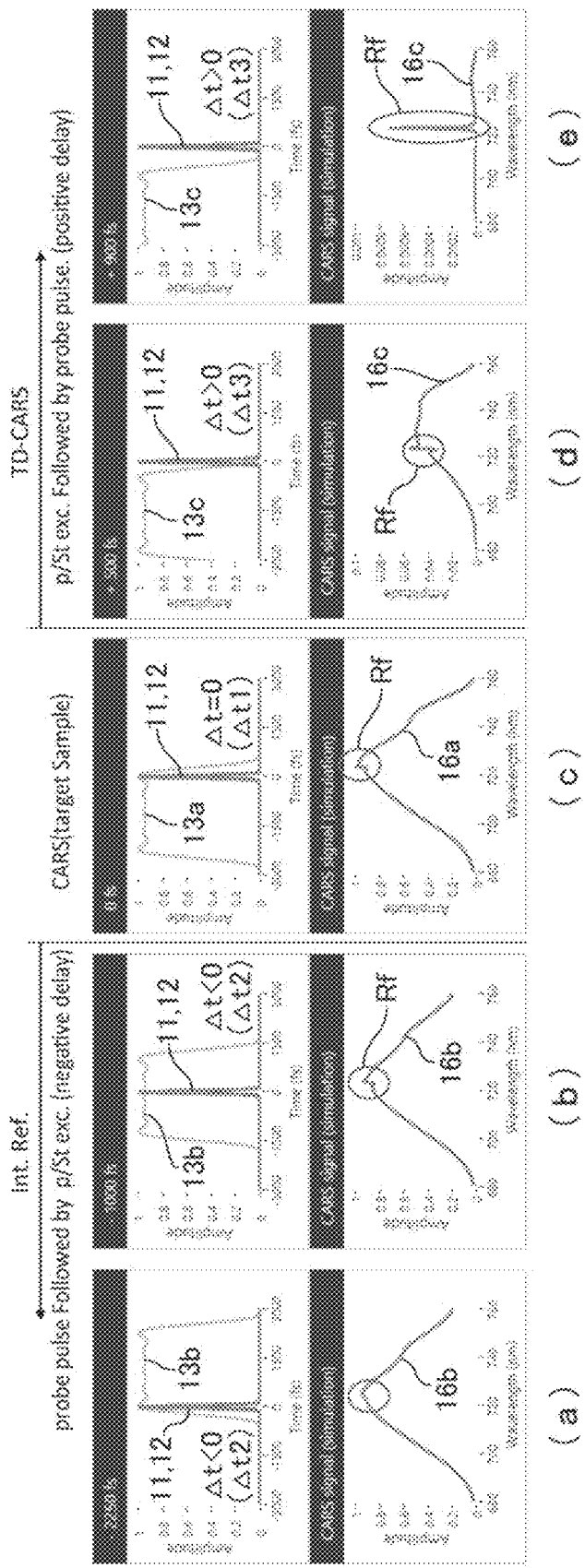

[Fig. 5]
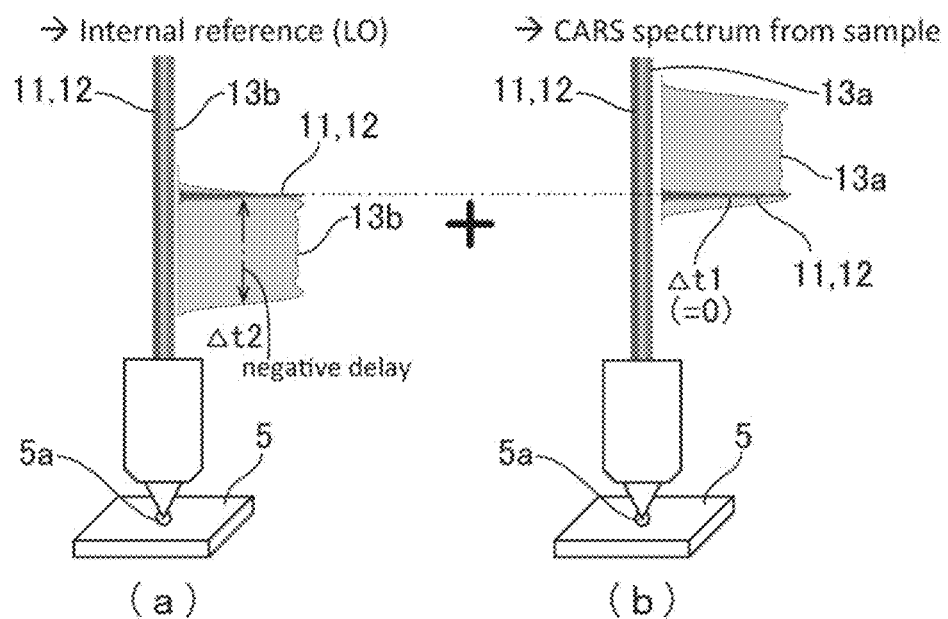
[Fig. 6]
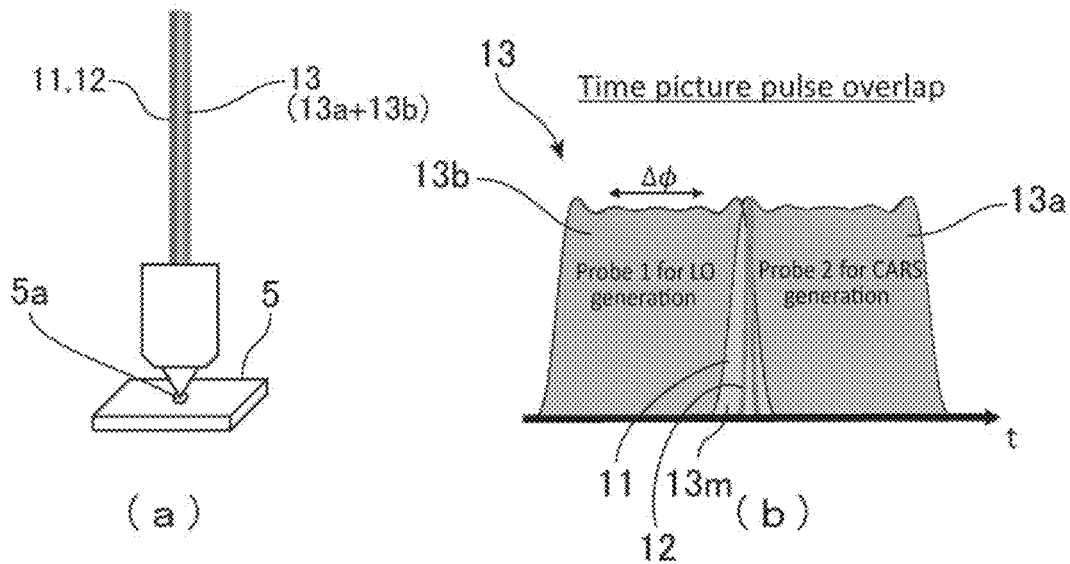

[Fig. 7]
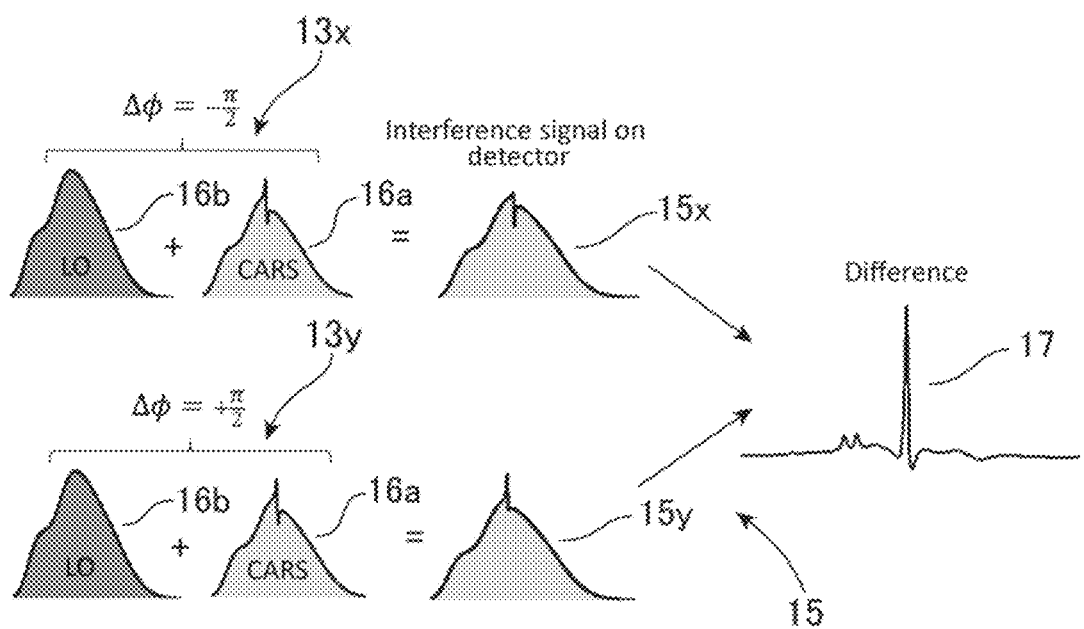

[Fig. 8]
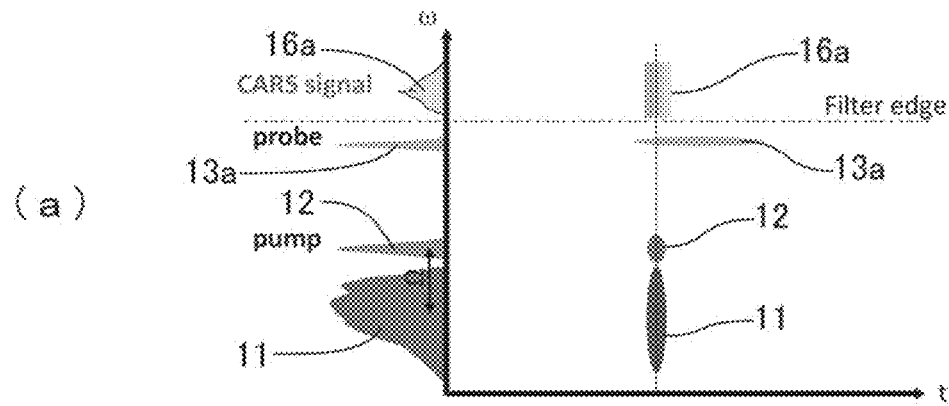
(a)
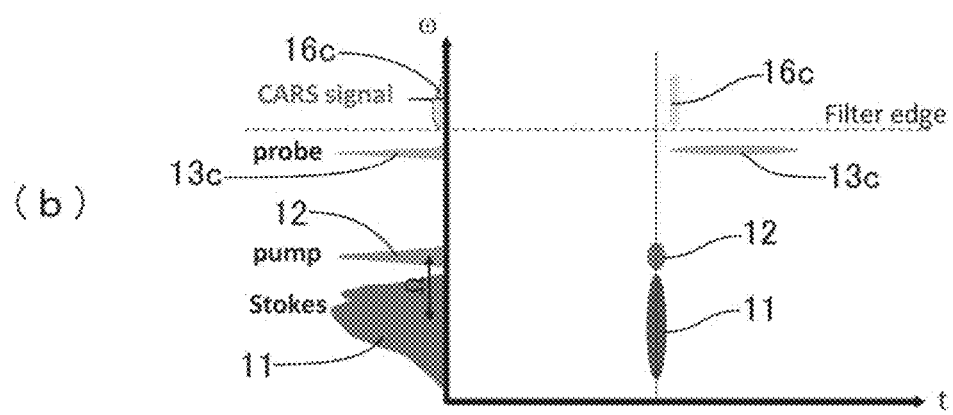
(b)
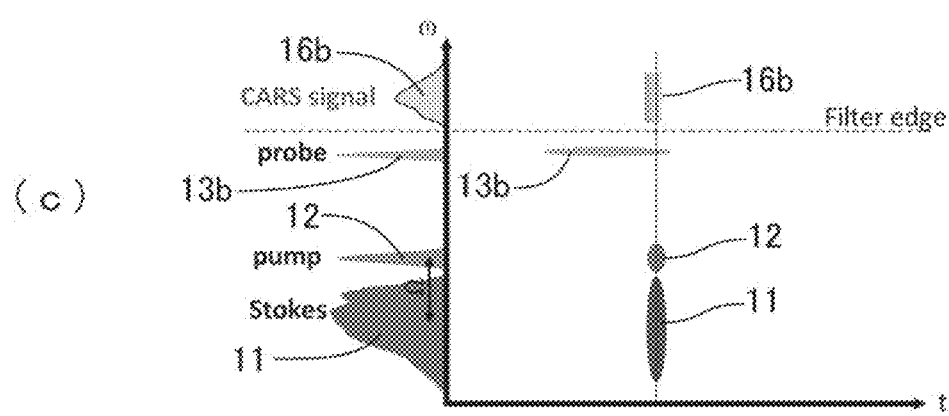
(c)

[Fig. 9]
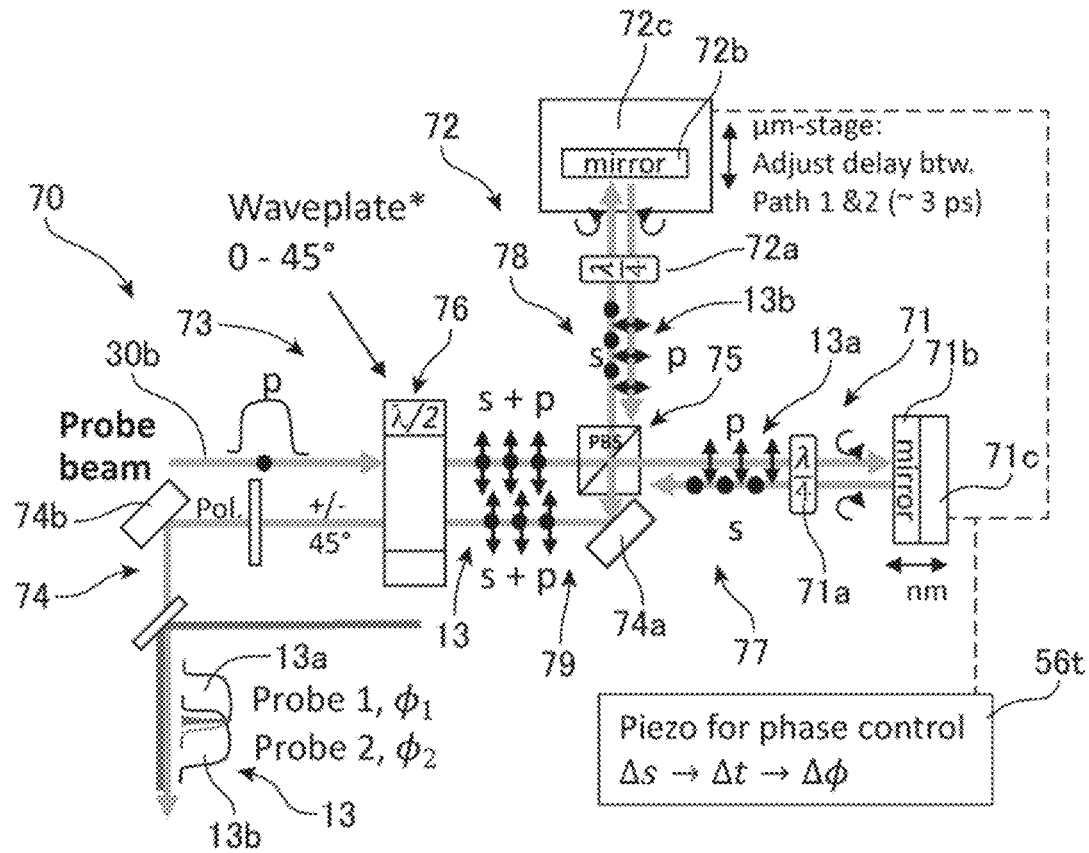
[Fig. 10]
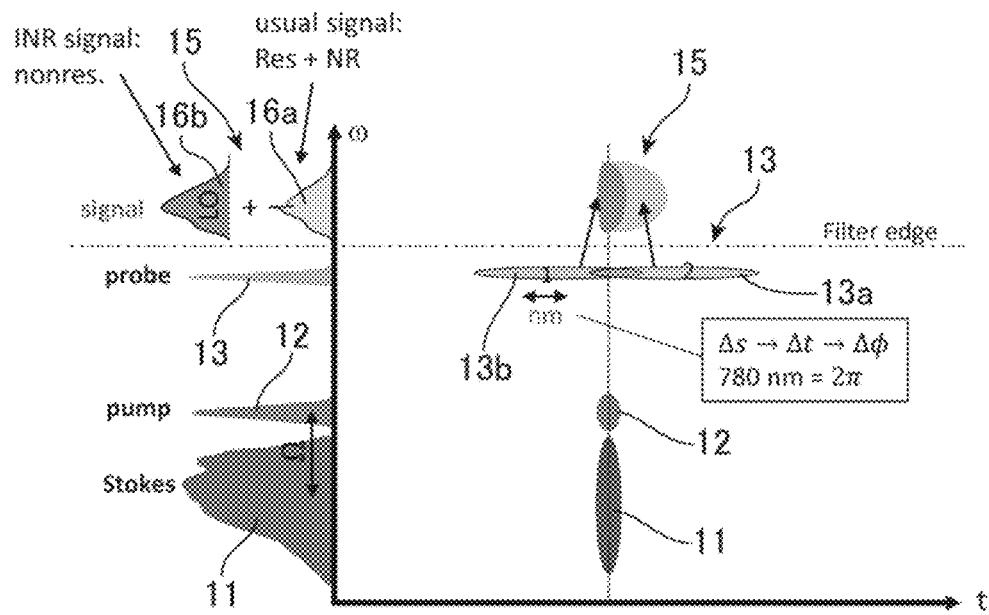

[Fig. 11]
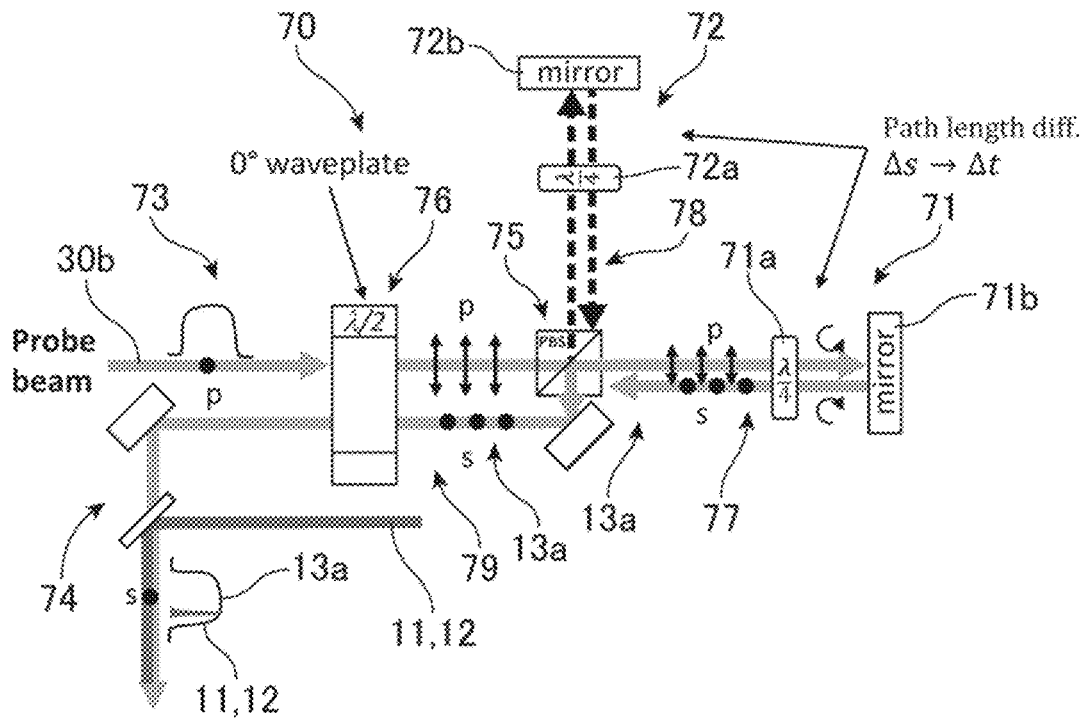
[Fig. 12]
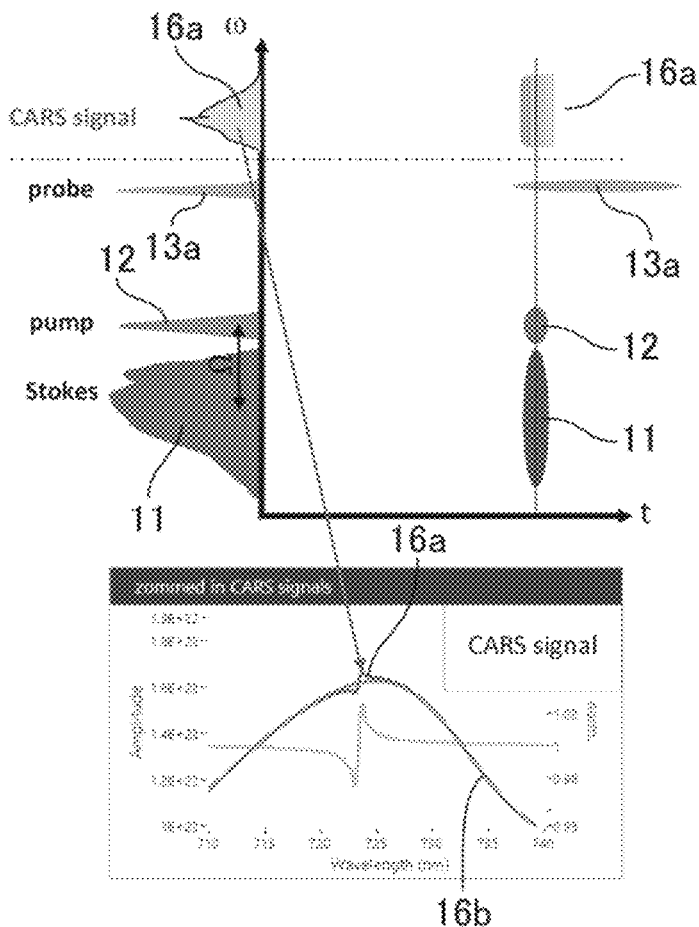

[Fig. 13]
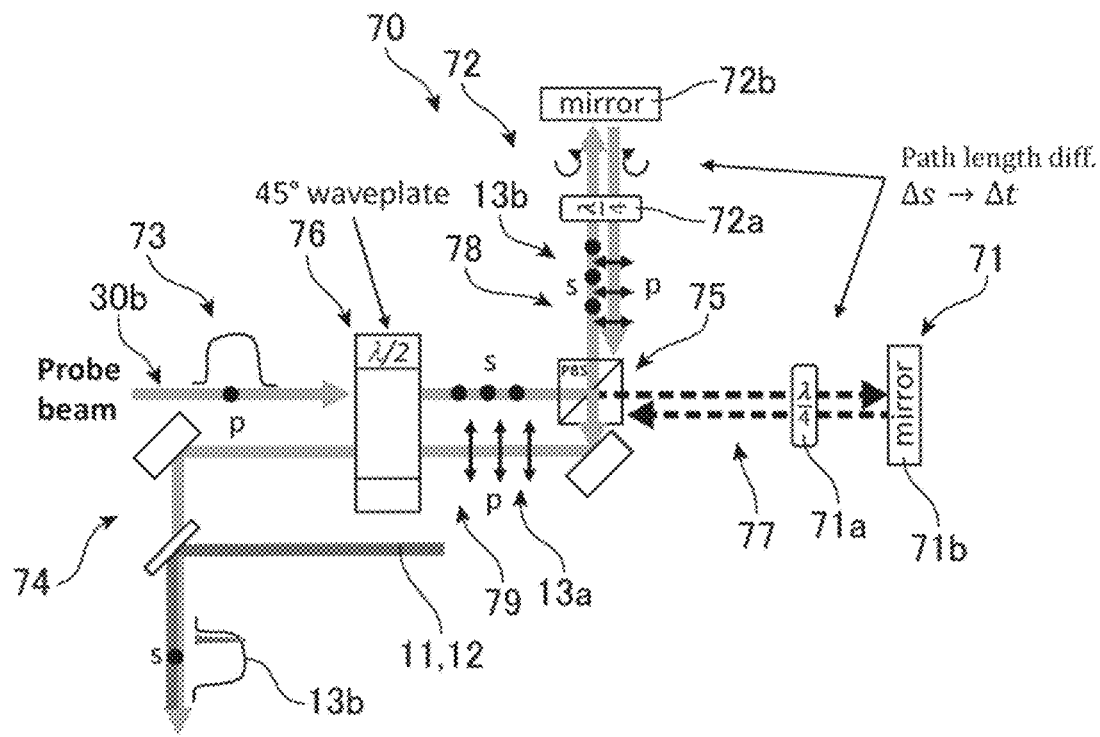
[Fig. 14]
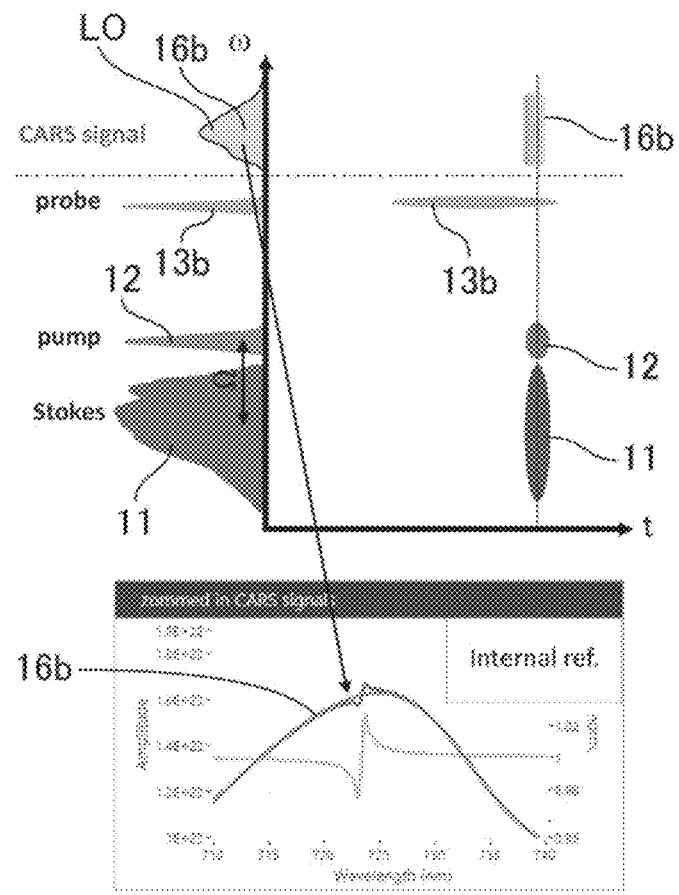

[Fig. 15]
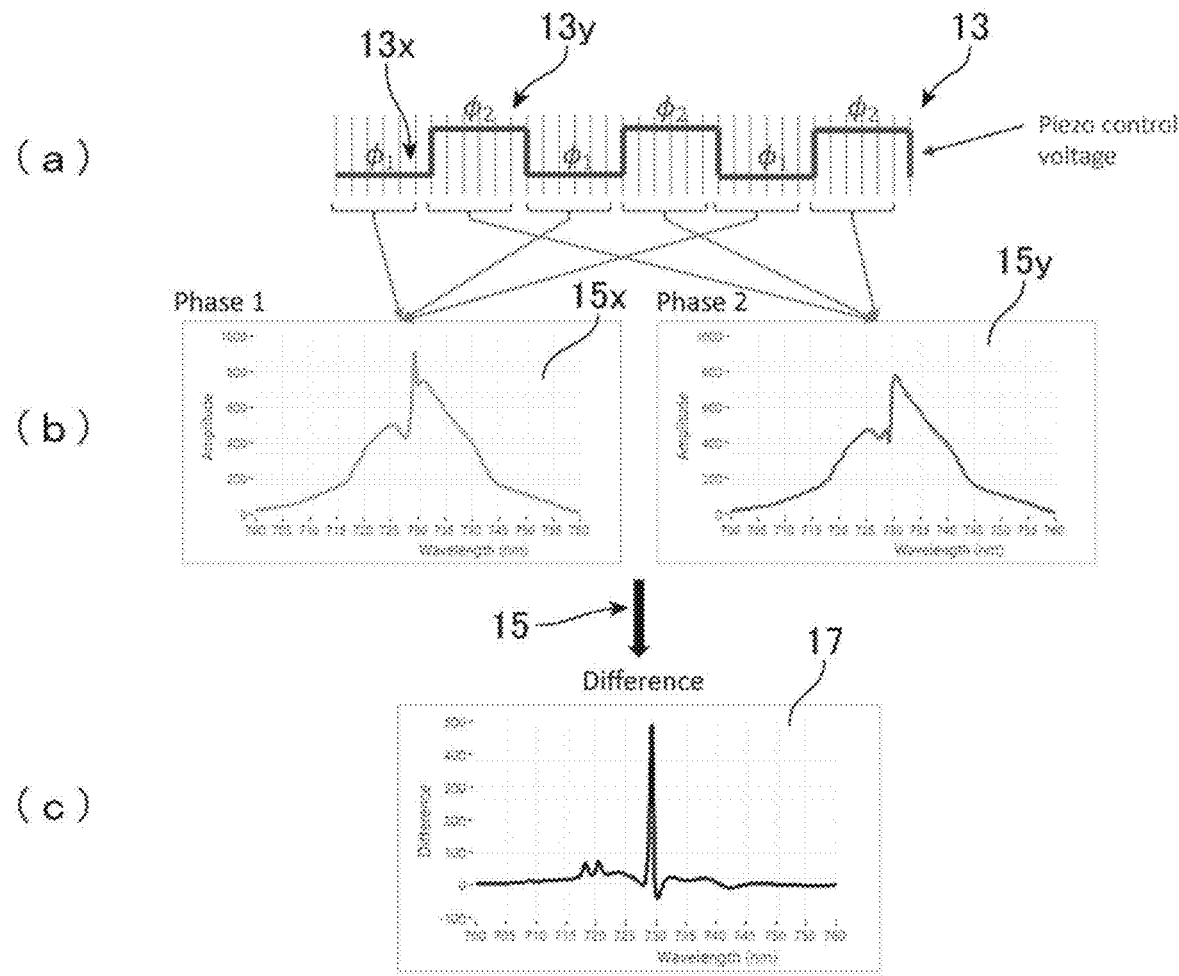
[Fig. 16]
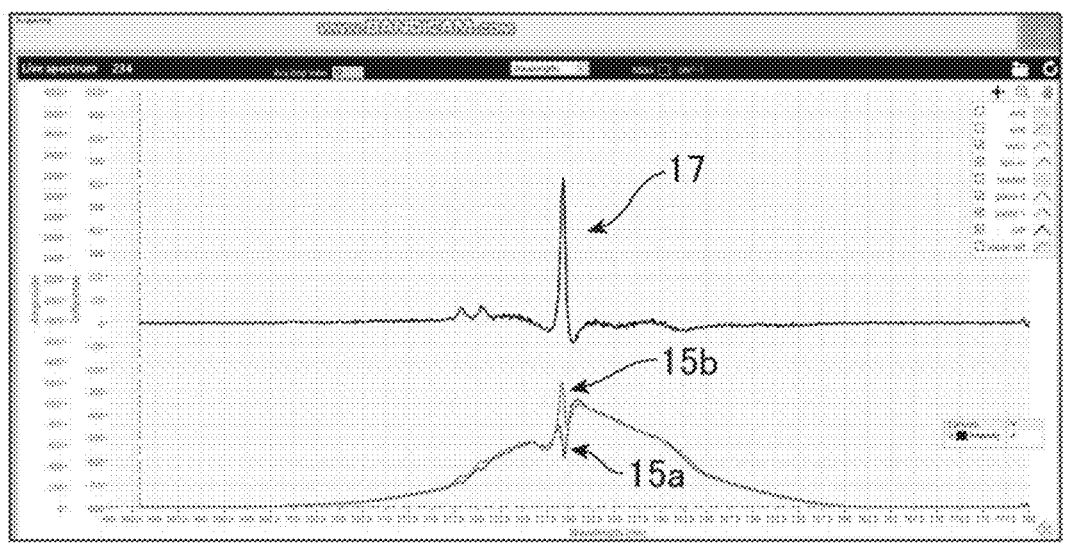

[Fig. 17]
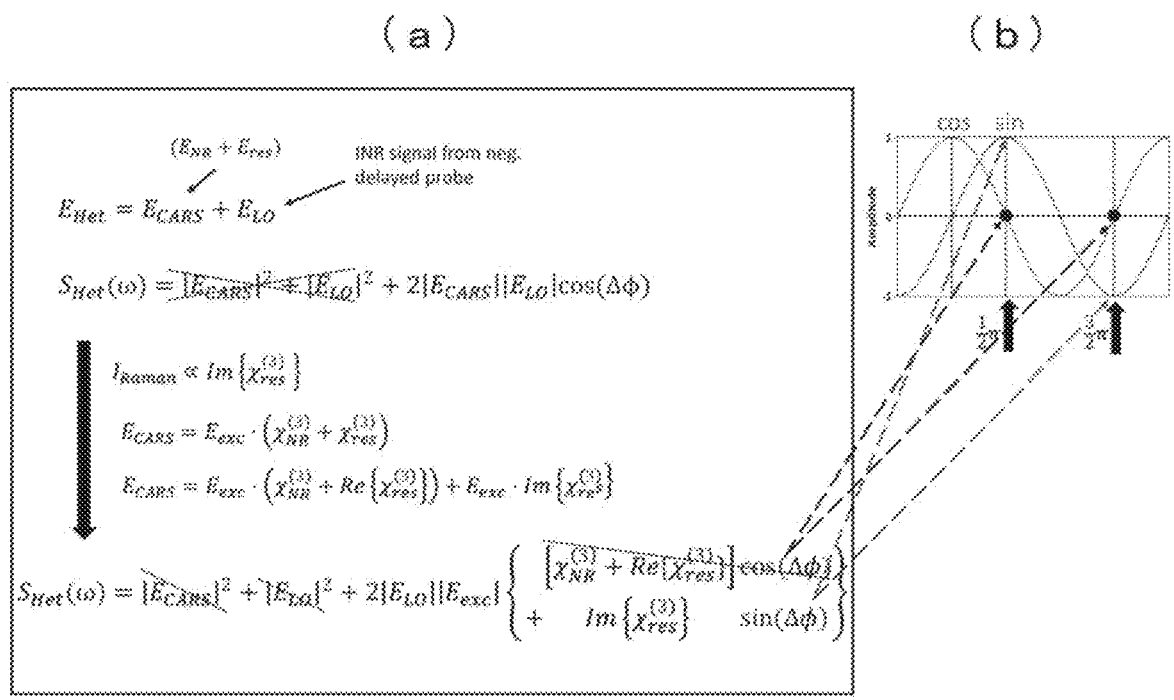

[Fig. 18]
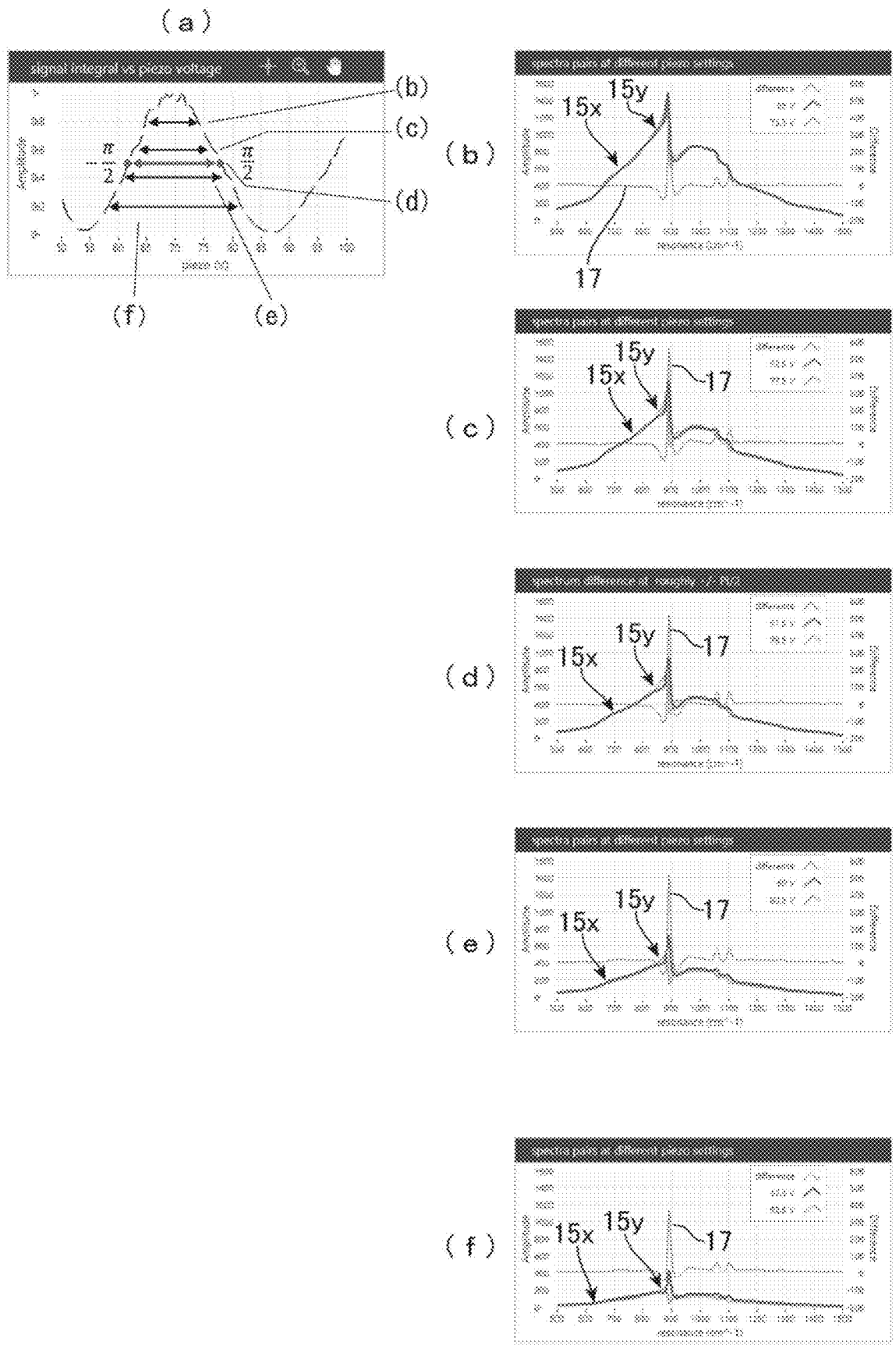

[Fig. 19]
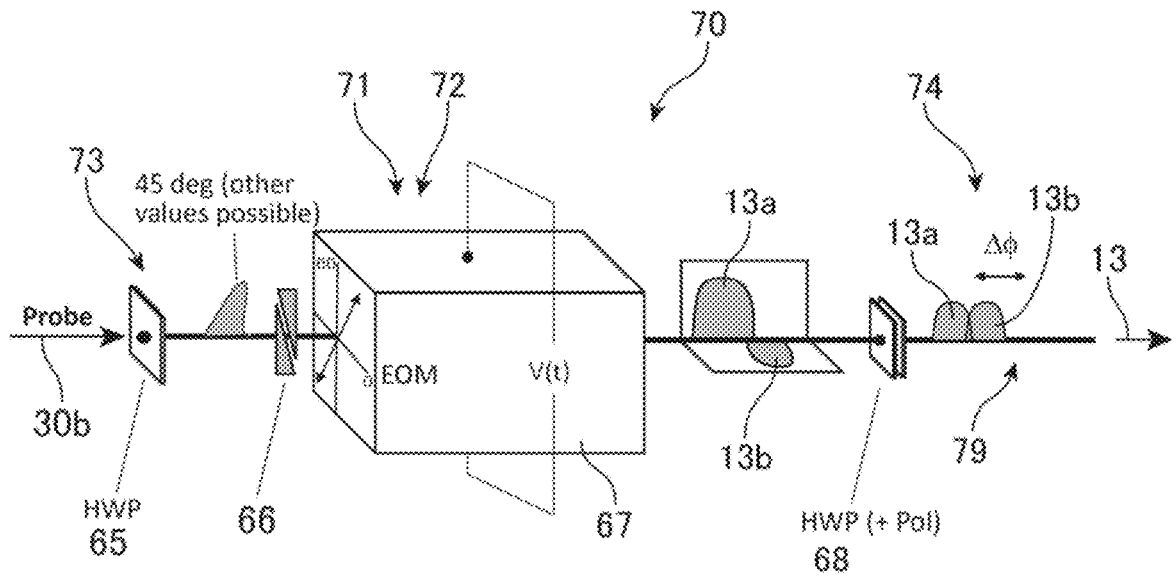
[Fig. 20]
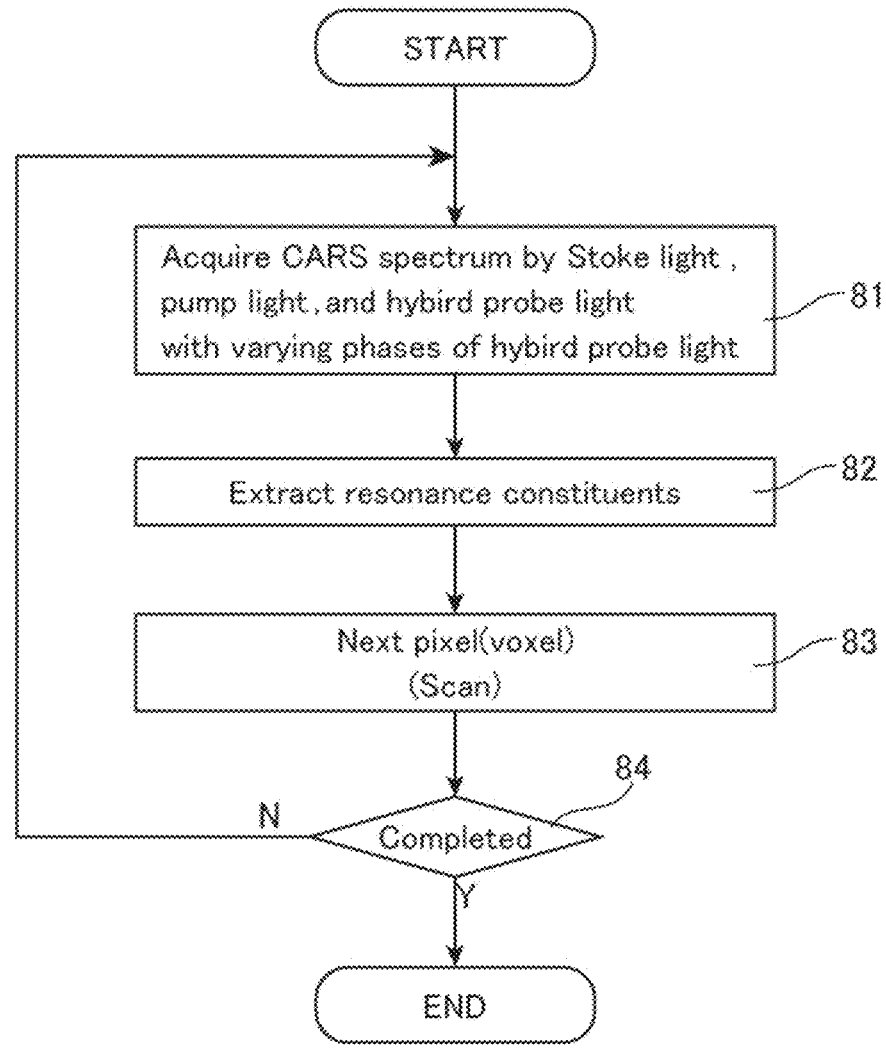

METHOD AND SYSTEM FOR ACQUIRING CARS SPECTRUM

TECHNICAL FIELD

The invention generally relates to a system and a method for acquiring CARS (Coherent Anti-Stokes Raman Scattering (Spectroscopy)) spectrum and/or spectra.

BACKGROUND ART

U.S. Pat. No. 7,388,668 discloses a system for detecting a non-linear coherent field induced in a sample volume. The system includes a first source for generating a first electromagnetic field at a first frequency, a second source for generating a second electromagnetic field at a second frequency, first optics for directing the first and second electromagnetic fields toward the sample volume, second optics for directing the first and second electromagnetic fields toward a local oscillator volume, and an interferometer. The interferometer is for interfering a first scattering field that is generated by the interaction of the first and second electromagnetic fields in the sample volume, with a second scattering field that is generated by the interaction of the first and second electromagnetic fields in the local oscillator volume.

Methods and systems that include detecting spectrum or scattering light of Coherent Anti-Stokes Raman Scattering (CARS) have been applied in a wide range of fields, for example, in the field of biochemicals and structural characterizations of a target of interest of a living subject, particularly for invasive and non-invasive evaluation of the biochemical compositions of a target of interest of a living subject and applications of the same.

SUMMARY OF INVENTION

However, the CARS spectra include resonant components and non-resonant components. Heterodyne detection using the local oscillation (LO) could have been one of the solutions to acquire resonant constituent from the CARS spectra. This method may include steps of (a) overlapping signal with a coherent, phase-stable LO showing a fixed phase relation with the signal, and (b) scanning phase difference of LO and signal. Phase differences can be controlled by delay stage, single moving mirror, move whole objective (cpi), pulse shaper, 2 glass wedges, and the like. Local oscillator sources could be a generator for generating LO signal from 2nd focus on the non-resonant sample, as disclosed in U.S. Pat. No. 7,388,668, external laser, Laser generated by coherent process (NOPA/OPA), Blue-wing of broadband laser (SB-CARS) and the like. However, such a method that acquires LO from outside, i.e., other than the target, includes the problem of time-consuming LO acquisition and switching, in addition to the instability caused by using different optical systems.

One of aspects of this invention is a method comprising: (i) acquiring sets of CARS spectrum by irradiating a part of a target with Stokes light pulses, pump light pulses and hybrid probe light pulses that include first probe light pulses and second probe light pulses, while varying phases of at least one of the first probe light pulses and the second probe light pulses; and (ii) extracting resonance constituents by comparing the sets of CARS spectrum acquired. The first probe light pulses and the second probe light pulses in the hybrid probe light pulses overlap in time in part, and the first and second probe light pulses partially overlap with the Stokes light pulse and the pump light pulse.

According to the findings of the inventor's simulation, by using the negative delay probe light pulses, the resonances are smeared out or almost smeared out from the spectrum and the spectrum can be used as LO signal or signals. In this method, LO signals can be got by using the one of pulses with negative delay (the second probe light pulses) in the hybrid probe light pulses from the target with the signals including resonance constituents generated by the other pulse (the first probe light pulses) in the hybrid probe light pulses at the same time. Hence, in this method, the second probe light pulses can be selected to generate local oscillation (LO) signals with the Stokes light pulses and the pump light pulses, and the first probe light pulses can be selected to generate signals including resonance constituents with the Stokes light pulses and the pump light. Therefore, this method allows the intrinsic interferometric stability, eliminates the need to measure references, does not require switching optics, and improves scanning speed. When switching sample for getting LO and the signals with resonance constituents, there was a possibility of instability factors such as laser drifting. But, in this method, because LO and signals with resonance constituents are acquired from the target using the same optics at the same time, no such changes or drifts will not occur between the measurements of LO and the signals with resonance constituents.

Pulse widths of the first and second probe light pulses may be larger than pulse widths of the Stokes light pulses and the pump light pulses. The acquiring the sets of CARS spectrum may include emitting the hybrid probe light pulses so that the first probe light pulses have a first relative temporal relationship to the Stokes light pulses and the pump light pulses to partially overlap within the pulse widths of the first probe light pulses and the second probe pulses have a second relative temporal relationship, which has a negative delay relative to the first relative temporal relationship, to the Stokes light pulses and the pump light pulses to partially overlap within the pulse widths of the second probe pulses. The acquiring the sets of CARS spectrum of the method may include emitting the hybrid probe light pulses so that the second probe light pulses are emitted earlier than the pulses of Stokes light and the pump light. The acquiring the sets of CARS spectrum of this method may include emitting the hybrid probe light pulses so that the Stokes light pulses, the pump light pulses and the first probe light pulses effectively at the same time and the Stokes light pulses and the pump light pulses effectively at the end of the pulse widths of the second probe light pulses.

The method may further include scanning the target with the Stokes light pulses, the pump light pulses, and the hybrid probe light pulses to acquire the sets of CARS spectrum at each pixel for performing 2D CARS microscopy imaging. The method may further include scanning the target with the Stokes light pulses, the pump light pulses and the hybrid probe light pulses to acquire the sets of CARS spectrum at each voxel for performing 3D CARS microscopy imaging.

One of other aspects of this invention is a system comprising: (i) an optical path configured to irradiate a part of a target with Stokes light pulses, pump light pulses and hybrid probe light pulses with first probe light pulses and second probe light pulses in the hybrid probe light pulses overlapping in time in part, with the first and second probe light pulses partially overlapping with the Stokes pulse and the pump pulse, and with at least one of the first probe light pulses and the second probe light pulses varying phase; and (ii) a detector configured to detect CARS spectrum generated by the Stokes light pulses, the pump light pulses and the hybrid probe light pulses to acquire sets of CARS spectrum in association with the phases of the hybrid probe light pulses.

Yet one of other aspects of this invention is a computer program or computer program product stored in a non-transitory medium for a computer to operate the system described above. The computer program (program product) includes instructions for controlling the system to acquire the sets of CARS spectrum and extracting resonance constituents by comparing the sets of CARS spectrum acquired.

BRIEF DESCRIPTION OF DRAWINGS

The embodiments herein will be better understood from the following detailed description with reference to the drawings, in which:

FIG. 1 depicts an embodiment of a system of this invention;

FIG. 2 depicts typical CARS process and signal dependences using different charts;

FIG. 3 depicts typical pulses of the Stokes light, the pump light and the probe light, and generated CARS spectrum generated;

FIG. 4 depicts examples of CARS spectrum when the delays of the probe light are varied;

FIG. 5 depicts examples of CARS measurement and internal reference measurement;

FIG. 6 depicts example of CARS measurement using the hybrid probe light pulse; and internal reference measurement;

FIG. 7 depicts examples of CARS spectrum generated by the hybrid probe light pulses with different phases;

FIG. 8 depicts examples of CARS spectrum when the delays of the probe light are varied using time-frequency maps;

FIG. 9 is a block diagram an example of the probe pulse generator;

FIG. 10 depicts signals in the internal heterodyne method using the time-frequency map;

FIG. 11 depicts an example of process by which the first probe light pulses are generated in the probe pulse generator;

FIG. 12 depicts signals for CARS generating with the first probe light pulses using the time-frequency map;

FIG. 13 depicts an example of process by which the second probe light pulses are generated in the probe pulse generator;

FIG. 14 depicts signals for CARS generating with the second probe light pulses using the time-frequency map;

FIG. 15 depicts an example of process by which the resonant constituents are extracted from the sets of CARS spectrum;

FIG. 16 illustrates waveform examples of two types of cars spectrum and the resonant constituents obtained by the simulation;

FIG. 17 shows theoretical backgrounds of the inter heterodyne method;

FIG. 18 depicts examples of the sets of CARS spectrums and the resonant constituents;

FIG. 19 depicts another example of the probe pulse generator;

FIG. 20 depicts a flow diagram of inter heterodyne detection method.

DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

FIG. 1 illustrates a system 1 according to an embodiment of this invention. The system 1 comprises an optical module 10 that is configured to supply (emit) Stokes light pulses 11, pump light pulses 12 and hybrid probe light pulses 13 for irradiating a part 5a of a target 5 to generate CARS (Coherent Anti-Stokes Raman Scattering or Coherent Anti-Stokes Raman Spectroscopy) signals (CARS spectrums, CARS lights) 15 on the part 5a of the target (object, sample) 5. This system 1 can be used as a measurement device, analyzer, monitoring device, monitor and others depending on the applications. The optical system 10 uses CARS to acquire data indicative of surface and internal conditions and components of a target 5, such as samples in a cuvette or a human body.

The system 1 further comprises: a scanner (scanning interface) 60 that is configured to scan the target 5 with the Stokes light pulses 11, the pump light pulses 12, and the probe pulses 13, and acquire the CARS light 15 from the target 5 through a lens 28 and other optical elements; a probe pulse generator 70 that is configured to generate and control phases of the hybrid probe light pulses 13; a detector 50 that is configured to detect the CARS light 15 for analyzing; and a controller 55 that is configured to control the system 1 and the modules such as the scanner 60, the probe pulse generator 70, and a laser source 30. The scanning module 60 may be configured to scan a cuvette, or act as a non-invasive sampler, an invasive sampler, a flow path, or a wearable scanning interface such as a fingertip scanning interface module. The controller 55 includes a laser controller 58 that controls the laser source 30, and an analyzer 56 that analyzes internal compositions (components) by CARS (CARS spectrum). The analyzer 56 may include multiple modules to verify the part 5a of target 5 at which the CARS light 15 is generated. A program (program produce, software, application) 59 stored in the memory of the controller 55 is provided for running the process on the controller 55 with computer resources such as the memory, CPU, and others. The program (software) 59 may be stored in other memory medium (non-transitory medium) readable by a processor or a computer. The program may include instructions for controlling the system 1 to perform the process described in this specification.

The optical system 10 includes a laser source 30 for generating first laser pulses 30a with a first wavelength 1040 nm for the Stokes light pulses (Stokes beam pulses) 11 and the pump light pulses (pump beam pulses) 12. One of the preferable laser sources 30 is a fiber laser. The first laser pulses 30a have one to several hundred fs (femtosecond)-order pulse widths with tens to hundreds of mW to generate pulses of the Stokes light 11 and the pump light 12 with femtosecond-order pulse widths. Pules widths PW1 of the pulses of the Stokes light 11 and the pump light 12 may be one to several hundred such as 1-900 fs, or may be 10-600 fs, or may be 50-400 fs. The optical system 10 includes a plurality of optical elements 29 such as lenses, filters, mirrors, dichroic mirrors and prisms for arranging optical paths to separate and combine the leaser light pulses.

The optical system 10 includes an optical path 20 configured to irradiate a part 5a of a target 5 with the Stokes light pulses 11, the pump light pulses 12 and the hybrid probe light pulses 13. The optical path 20 includes a Stokes light path (first optical path, Stokes unit) 21 that is configured to supply the broadband Stokes light pulses 11 with a first range R1 of wavelengths 1080-1300 nm from the first laser pulses 30a which are common to the pump light pulses 12, through the PCF (Photonic Crystal Fiber, fiber) 21a. The optical path 20 includes a pump light path (second optical path, pump unit) 22 that is configured to supply the pump light pulses (second light pulses) 12 with a second range R2 of wavelengths 1070 nm that is shorter than the first wavelength range (first range) R1 from the first laser pulses 30a which is common to the Stokes light 11. The optical path 20 includes a common optical path that supplies the Stokes light pulses 11 provided by the path 21 and the pump light pulses 12 provided by path 22 to the optical I/O unit (lens system) 28 with the hybrid probe light pulses 13. The optical paths include necessary optical elements such as filters, fibers, dichroic mirrors and prisms to configure each optical path. The same applies to the optical paths described below.

The laser source 30 generates, in addition to the first laser pulse 30a with a first wavelength 1040 nm for the Stokes light pulses 11 and the pump light pulses 12, a second laser pulses 30b with a second wavelength 780 nm for the probe light pulses (probe beam pulses) 13. The second laser pulses 30b may include one to several tens ps (picosecond)-order pulses with tens to hundreds of mW to generate pulses of the probe light 13 with picosecond order pulse widths. Pules widths PW2 of the pulses of the probe light 13 may be one to several tens such as 1-90 ps, or may be 1-50 ps, or may be 2-10 ps. The second laser pulses 30b with the wavelength of 780 nm may be generated from the source oscillator with a wavelength of 1560 nm. The optical path 20 includes, in addition to the Stokes light path 21 and the pump light path 22, a probe light path (third optical path) 23 that is configured to supply the probe light pulses (probe beam pulses) 13 with a third range R3 of wavelength of 780 nm that is shorter than the second wavelength range R2.

The optical path 20 further includes the optical I/O unit (optical unit) 28 that is configured to coaxially output the Stokes light pulses 11, the pump light pulses 12 and the probe light pulses 13 to the target 5 and acquire a CARS light 15 from the target 5 via a common light path. A typical optical I/O unit 28 is an objective lens or lens system that faces to the target 5 and gets backward CARS light pulses (Epi-CARS) 15. The optical system 10 may include an optical path configured to get forward CARS light. In this system 1, the CARS light pulses 15 with a range of wavelengths of 680-760 nm that is shorter than the wavelength range R3 is generated by the probe light pulses 13 and acquired to be detected by the detector 50.

The probe light path 23 includes the probe pulse generator (probe pulse conditioner) 70 that is configured to generate the hybrid probe light pulses (paired probe light pulses, combined probe light pulses) 13 by the first probe light pulses 13a and the second probe light pulses 13b. The first probe light pulses 13a and the second probe light pulses 13b overlap in time in part and the first probe light pulses 13a and the second probe light pulses 13b respectively partially overlap with the Stokes pulse 11 and the pump pulse 12. In addition, the probe pulse generator 70 is configured to vary the phases of at least one of the first probe light pulses 13a and the second probe light pulses 13b. The probe pulse generator 70 is configured to control relative temporal relationships between each pulses of the probe light 13a and 13b and the pulses of the Stokes light 11 and the pump light 12 within the pulse width PW2 of the probe light pulses 13a and 13b. Typically, the probe pulse generator 70 controls (varies, sets, or modulates) a time difference $\Delta t$ between emissions of the probe light pulses 13a and 13b and emissions of the Stokes light pulses 11 and the pump light pulses 12. The probe pulse generator 70 may include a time delay stage (time delay unit) with collimator and an actuator such as a motor or a piezo that can modulate each light path (a length of light path) of the probe light pulses 13a and 13b as described below. The probe pulse generator 70 may include an LC-SLM (Liquid crystal spatial light modulator), an AWG (Arrayed wave-guide grating) and others control the distance between the collimators.

In this system 1, the second of probe light pulses 13b with a negative delay (inverse time delay) $\Delta tn$, which is one of the paired hybrid probe light pulses 13, are selected to generate local oscillation (LO) signals with the Stokes light pulses 11 and the pump light pulses 12. Hence, the probe pulse generator 70 is configured to generate the hybrid probe light pulses 13 with the first probe light pulses 13a and the second probe light pulses 13b with a negative delay $\Delta tn$ to the first probe light pulses 13a.

In this system 1, the probe pulse generator 70 includes a first probe pulse conditioner (first probe pulse unit, first probe pulse generator) 71, a second probe pulse conditioner (second probe pulse unit, second probe pulse generator) 72, an input interface 73, an output interface 74, and TD probe pulse conditioner (TD probe pulse unit, TD probe pulse generator) 75. The first probe pulse unit 71 is configured to generate the first probe light pulse 13a that has pulse widths PW2 larger than pulse widths PW1 of the Stokes light pulses 11 and the pump light pulses 12 and a first relative temporal relationship $\Delta t1$ to the Stokes light pulses 11 and the pump light pulses 12 to partially overlap within the pulse widths PW2 of the first probe light pulses 13a. The second probe pulse unit 72 is configured to generate the second probe pulse 13b that has pulse widths PW2 larger than pulse widths PW1 of the Stokes light pulses 11 and the pump light pulses 12 and a second relative temporal relationship $\Delta t2$, which has the negative delay $\Delta tn$ relative to the first relative temporal relationship $\Delta t1$, to the Stokes light pulses 11 and the pump light pulses 12 to partially overlap within the pulse widths PW2 of the second probe pulses 13b. The TD probe pulse unit 75 is configured to generate the TD probe light pulses 13c with a positive delay $\Delta td$ for generating TD-CARS spectrum.

In this system 1, the probe pulse generator 70 is configured to generate the hybrid probe light pulses 13 so that the second probe light pulses 13b with the negative delay $\Delta tn$ are emitted earlier than the pulses of Stokes light 11 and the pump light 12. Typically, the probe pulse generator 70 is configured to generate the hybrid probe light pulses 13 so that the first probe light pulses 13a are emitted with the Stokes light pulses 11 and the pump light pulses 12 effectively at a same time (the first relative temporal relationship $\Delta t1=0$) and the second probe light pulses 13b are emitted so that the Stokes light pulses 11 and the pump light pulses 12 are emitted effectively at an end of the pulse widths PW2 of the second probe light pulses 13b (the second relative temporal relationship $\Delta t2$ and the negative delay $\Delta tn$ are almost corresponding or equal to PW2). The negative time delay may be few 1000 fs (few picoseconds) or more to the excitation by the pulses of the Stokes light 11 and the pump light 12.

The first probe unit 71 and/or the second probe unit 72 may include the function for varying a phase difference Δφ between the phases φ1 of the first probe light pulses 13a and the phases φ2 of the second probe light pulses around plus and minus Pi/2 ((+/−)π/2). In this system 1, the second probe pulse unit 72 modulates the second probe light pulses 13b to vary the phases φ2 to include the phase difference Δφ around plus and minus Pi/2 ((+/−)π/2) in the hybrid probe light pulses 13. relative phase difference Δφ provided by the probe pulse generator 70 may be varied or set under the control of the phase controller (timing controller, modulation controller) 56t in the controller 55. By using the generator 70, the probe light path 23 may supply typically two kinds (types) of the hybrid probe light pulses 13x and 13y with different phase differences Δφ plus and minus Pi/2 ((+/−)π/2) between the first probe light pulses 13a and the second probe light pulses 13b paired or combined as the hybrid probe light pulses 13 for irradiating at the point 5a of the target 5 via the optical I/O unit 28 to get typically two kinds (types) of CARS pulses 15x and 15y with different phases of resonance components on LO signals by the pulses of the Stokes light 11, the pump light 12 and the hybrid probe light 13.

The controller 55 further includes a CARS spectrum acquisition module (CARS acquisition module, CARS acquisitor) 56a. The CARS acquisition module 56a controls the probe pulse generator 70 via the phase controller 56t to acquire sets of CARS spectrum 15 that include CARS spectrum 15x and 15y in association with the phases of the hybrid probe light pulses 13 by irradiating a part 5a of a target 5 with the Stokes light pulses 11, the pump light pulses 12 and hybrid probe light pulses 13 synchronously, varying the phases of the hybrid probe pulses 13. The controller 55 may further include a TD-CARS acquisition module 56b that controls the probe pulse generator 70 via the phase controller 56t to acquire TD-CARS spectrum using the TD (time delay) probe light pulses 13c with the positive delay Δtd to the Stokes light pulses 11 and the pump light pulses 12.

The detector 50 is configured to detect CARS spectrum 15x and 15y generated by the pulses of the Stokes light 11, the broadband pump light 12, and the hybrid probe light 13x and 13y to acquire sets of CARS spectrum 15 including spectrums 15x and 15y in association with the phase differences of the hybrid probe light 13x and 13y.

The controller 55 may further include an extraction module (extractor) 56d, as one of the functions of analyzer 55, configured to extract the resonance constituents (resonant features) Rf from the sets of CARS spectrums 15 by comparing the sets of CARS spectrum acquired to analyze the features or compositions of the part 5a of the target 5. The extraction module 56d may include the functions of scanning the target 5 by using the scanner 60. The scanner 60 is configured to scan the target 5 with the Stokes light pulses 11, the pump light pulses 12, and the hybrid probe light pulses 13x and 13y to acquire the sets of CARS spectrum 15 at each pixel. The analyzer 56 may include an image generation module (image generator) 56e that generates images (2D images) of the target 5 by the pixels having the resonant features Rf. Accordingly, the system 1 may have the functions of CARS spectroscopy and CARS microscopy.

In CARS spectroscopy, by moving the focus or spot of the Stokes light 11, the pump light 12 and the probe light 13, the system 1 can generates the depth profile of the target 5. Hence, the scanner 60 may be configured to scan the target 5 with the Stokes light pulses 11, the pump light pulses 12, and the hybrid probe light pulses 13x and 13y in three dimensions to acquire the sets of CARS spectrum 15 at each voxel. The analyzer 56 may include a 3D image generation module (3D image generator) 56f that generates 3D images of the target 5 by the voxels having the resonant features Rf. Accordingly, the system 1 may have the functions of CARS 3D microscopy.

By using a broadband Stokes pulses (Stokes beam) 11, one can excite many resonances at once and record a full spectrum in one shot. Therefore, by scanning the target (sample) 5, full CARS spectrums 15x and 15y can be provided at each pixel or voxel by each shot to make the 2D or 3D CARS imaging in a short time. In addition, by using the system 1, CARS spectrums 15x and 15y that include both LO signals and the resonant features at once at each pixel or voxel from the actual measurement position in the target 5 including tissue and the like. Since differences in generation, optical path, scattering, sample heterogeneity, and other artifacts are cancelled out between the LO signals and the resonant features, the CARS spectrums (spectra) with boosted sensitivity are generated by the system 1.

FIG. 2 shows typical CARS process and signal dependences. FIG. 2(a) shows the energy map of the Stokes light pulses 11, the pump light pulses 12, the probe light pulses 13 and a generated CARS signal 16. FIG. 2(b) shows these signals in frequency domain and FIG. 2(c) shows these signals in time domain. Each domain alone is not sufficient to explain the signal behavior in the present invention from the viewpoints of the signals depend on temporal overlapping and the signals depend on generating with frequencies. Explanation of this invention will use the time-frequency map for better understanding. FIG. 2(d) shows an example for explaining the Stokes light pulses 11, the pump light pulses 12, the probe light pulses 13 and the generated CARS signal 16 using time-frequency map.

FIG. 3 shows typical CARS spectrum (light, signals, spectrum, spectra) including the broad non-resonant background (NRB) and a Resonant feature (Rf) (FIG. 3 (b)), generated by the pulses of the Stokes light 11, the pump light 12 and the probe light (first probe light pulses) 13a with the time delay Δt1 (0 fs) (FIG. 3 (a)), that is, the Stokes pulse 11, the pump pulse 12 and the probe pulse 13a are emitted at the same time and the time delay feature (compositions, constituent) of CARS signal 16a is acquired within the pulse width PW2 of the Probe light pulses 13a. The Stokes pulse 11 and the pump pulse 11 are overlap in time and the position of the probe pulse 13a can be controlled. The difference in time (temporal relationship, time delay) Δt between the pulses of the Stokes light 11 and the pump light 12 and the probe pulse 13a is chosen arbitrarily. In FIG. 3 (a), the time delay Δt is set to Δt1 (t=0), that is, the Stokes pulse 11 and the pump pulse 12 are overlap with the start (arrives first) 13s of the probe pulse 13a, after that the rest of the probe pulse 13a arrives later including the end (arrives the latest) 13c.

FIG. 4 shows examples of the CARS lights (signals, spectrum, spectra) 16 as the simulation results when the delays (temporal relationships) Δt of the probe lights 13a, 13b and 13c are changed. FIG. 4(c) shows an example of the CARS spectrums 16a generated by the Stokes pulse 11, the pump pulse 12 and the first probe pulse 13a emitted at the same time (the time delay Δt is set to Δt1 (Δt=0)). FIGS. 4(a) and 4(b) show examples of the internal references (LO signals) 16b generated by the Stokes pulse 11 and the pump pulse 12, and the second probe pulses 13b with the negative delays Δt2(Δtn). That is, the Stokes pulses 11 and the pump pulses 12 are emitted later than the emission of the second probe pulses 13b but to overlap with the second probe pulses 13b. Typical internal reference (LO signal) 16b is acquired as shown in FIG. 4(a) when the Stokes pulse 11 and the pump pulse 12 are emitted to overlap with the end of the second probe pulse 13b.

FIGS. 4(d) and 4(c) show examples of the TD-CARS spectrums 16c generated by the Stokes pulse 11 and the pump pulse 12, and the probe pulse 13c with the positive delay Δt3 (Δtd). That is, the probe pulse 13c is emitted later than the emission of the Stokes pulse 11 and the pump pulse 12 so as the probe pulse 13c does not overlap with the Stokes pulse 11 and the pump pulse 12. Typical TD-CARS 16c is acquired as shown in FIG. 4(c) that is formed almost exclusively of resonance components (resonance constituent, resonant feature) Rf, but has very small intensity compared to the target CARS spectrums 16a and the internal references 16b.

As are shown in FIGS. 4(a) to 4(c), the phenomena such as molecular vibration changes with long decay time, which are corresponding to resonant feature (Rf), require longer buildup, and the phenomena such as molecular vibration changes with shorter decay time, which are corresponding to NRB, require shorter time for build-up. That is, NRB is an instantaneous electronic response. Resonant feature (Rf) is slower build-up, the same trend is shown in the simulation results of TD-CARS. Long decay time also requires longer buildup (narrow linewidths) and shorter decay times require shorter time for response buildup (broader linewidths). Therefore, the CARS spectrum 16a with larger resonant features with NRB is acquired when emitting the first probe pulse 13a at the same time with the Stokes pulse 11 and the pump pulse 12, and the internal reference 16b that is the CARS spectrum with almost NRB (In this specification, a spectrum containing mostly or exclusively NRB indicates a spectrum that does not contain resonance components to a sufficient degree to serve as a reference for NRB) is acquired when emitting the Stokes pules 11 and the pump pulse 12 at the end of pulse width PW2 of the second probe pulse 13b.

FIGS. 5 to 7 show a basic concept (Heterodyne Internal Reference, internal hetcrodyning, internal heterodyne method) of this invention. As is shown in FIG. 5, by varying the temporal relationships Δt of the Probe pulses 13a and 13b to the Stokes pulses 11 and the pump pulses 12, the CARS spectrum 16a with the resonant features with NRB (FIG. 5 (b)) and the CARS spectrum (Internal Reference, INR) 16b with NRB only (FIG. 5 (a)) can be acquired without changing the samples and the cuvettes under the exact same experimental conditions (focus, scattering, absorption, optical path, etc.). Therefore, by using the INR 16b as the local oscillator (LO), the resonant features can be extracted by the heterodyne method. That is, by generating the INR 16b and the CARS signal 16a with the resonant futures simultaneously at same position, INR 16b will interfere with the CARS signal 16a as the local oscillator (LO) on the detector 50. In addition, the interference signal depends on phase difference Δφ between the LO 16b and the CARS signal 16a that includes the resonance (res.) and the non-resonance (NR) components.

As Shown in FIG. 6(a), by sending the hybrid probe light pulses 13 that include two time-delayed probe pulses 13a and 13b simultaneously with the Stokes light pulses 11 and the pump light pulses 12 (as shown in FIG. 6(b)) to the sample 5, interfering signals (target CARS signals) 15x and 15y shown in FIG. 7 are generated simultaneously in the focus point 5a. In the hybrid probe light pulses 13, the first probe light pulses 13a include a time difference between the second probe light pulses 13b and partially overlap in time with the second probe light pulses 13b. In addition, the Stokes light pulses 11, the pump light pulses 12 and the hybrid probe light pulses 13 are emitted so that the overlapping parts 13m of the first probe light pulses 13a and the second probe light pulses 13b overlap with the Stokes light pulses 11 and the pump light pulses 12. The probe pulses 13a and 13b in the hybrid probe light pulses 13 respectively generate scattered signals (CARS) 16a and LO (local oscillator (internal ref.)) 16b. The two generated signals 16a and 16b are interfered on the detector 50 to make the interfered or synthesized (combined) signals 15x and 15y that are the sets of CARS spectrum (target CARS spectrum) 15.

In this system 1, by varying (changing) the phases φ2 of the second probe light pulses 13b for LO plus and minus Pi/2 ((+/−)π/2), the hybrid probe light pulses 13 having two types 13x and 13y are provided. The one of the two types is the hybrid probe light pulses 13x that include the first probe light pulses 13a and the second probe light pulses 13b with the phase difference Δφ of minus Pi/2. The other of the two types is the hybrid probe light pulses 13y that include the first probe light pulses 13a and the second probe light pulses 13b with the phase difference Δφ of plus Pi/2. Interference and the signal shape of target CARS spectrums 15 can be controlled through changing phase difference Δφ of the hybrid probe light pulses 13. Therefore, the sets of target CARS spectrum 15 include the target CARS spectrums 15x that have shapes of the LO 16b minus the CARS 16a; and the target CARS spectrums 15y that have shapes of the LO 16b plus the CARS 16a are generated and acquired by using the hybrid probe light pulses 13 with varying the phase difference Δφ. Then, the resonant constituent 17 can be delivered or extracted from the sets of CARS spectrum 15 using the phase difference Δφ.

Resonance and non-resonance contributions show different phase (and polarization) properties. Thus, resonance and non-resonance electrical fields have different phases, but phase information is lost at detection. By using Heterodyne detection where overlapping signal with a coherent reference beam (Local Oscillation, LO) for interferometric detection, the different phase relationships can be exploited to measure amplitude and phase of signal or to separate real and imaginary parts of $X^{(3)}$. The heterodyne detection includes a step of overlapping signal with a coherent, phase-stable LO showing a fixed phase relation with the signal and a step of scan phase difference of LO and signal.

As is shown in FIG. 6, both the CARS 16a with the resonant features with NRB and LO 16b with NRB only are acquired by the hybrid probe pulse 13 at the same time using the same optical route from the same spot 5a. Therefore, both signals 16a and 16b are subject to the same experimental conditions like absorption, signal path, and others. In addition, this internal heterodyne method is applicable to forward and backscattered CARS.

Local oscillator sources could be generated from 2nd focus (non-resonance sample), an external laser, a laser generated by coherent process (NOPA/OPA) or Blue-wing of broadband laser (SB-CARS). However, it is necessary to measure the reference to obtain the LO signals, and it takes time to switch between LO source and sample (target) measurement. In addition, fluctuations caused by switching optics, e.g., laser drafts, may cause differences in measurement conditions between the non-resonant and resonant components, making accurate measurement difficult. Therefore, it should be desirable to obtain the local oscillation (LO), instead of using the local oscillator volume, using only the sample to be measured (target).

In this system 1 with the inter heterodyne method, the following advantages can be mentioned. (i) An external LO is not required, LO is generated simultaneously from the same pulses at the same position, making it intrinsically stable and phase-locked (very long averaging becomes possible). (ii) No water measurement requirement, no switching with non-resonant sample necessary and complete signals come from the sample including LO. (iii) An etaloning, interference on detector can be eliminated and any differences can be cancelled out. (iv) The imaginary parts of $X^{(3)}$ can be extracted without using MEM (Maximum Entropy Method). (v) the system 1 is able to work in scattering samples like tissue. That is, the phase changes due to sample do not matter because the LO has the exact same optical path and is generated simultaneously.

FIG. 8 shows examples of CARS signal generation using the time-frequency maps. FIG. 8 (a) depicts an example of usual measurement with the first probe light pulses 13a that have no probe delay. The first probe light pulses 13a overlap with the excitation of the Stokes light pulses 11 and pump light pulses 12 and the CARS signals 16a with resonant and NR are generated. The CARS signals 16a generated have typical dispersive CARS line shape due to interfering resonant and non-resonant electrical fields (r-nr phase shift locked).

FIG. 8 (b) depicts an example of measurement with the TD probe light pulses 13c with time-delay (positive delay). The Stokes light pulses 11 and the pump light pulses arrive first and the TD-probe light pulses 13c are delayed. Because NR signal decays faster than vibrational resonant signal, the r/nr ratio increases but the signal intensity decreases. FIG. 8 (c) depicts an example of measurement with the internal reference probe pulses (second probe light pulses with negative delay) 13b. The probe light pulse 13b with negative probe delay arrives first. Because electronic NR signal generated immediately, there is no time for build-up of vibrational coherence and thus resonant signal is not generated. Generated signal 16b contains almost solely NR component ("internal reference (INR)").

FIG. 9 illustrates an embodiment of the probe pulse generator 70. FIG. 10 depicts signals in the internal heterodyne method using the time-frequency map. The probe pulse generator (probe pulse conditioner) 70 includes the first probe pulse conditioner (first probe pulse unit) 71, the second probe pulse conditioner (second probe pulse unit) 72, the input interface 73, and the output interface 74. The input interface 73 includes a waveplate 76 for converting polarization of input probe pulses 30b and a PBS 75 for separating the first probe pulses (for example p-pol light) 13a and the second probe pulses (for example s-pol light) 13b from the input probe pulses 30b. The first probe pulse unit 71 includes a first probe path 77 for conditioning the first probe pluses 13a, which includes a waveplate 71a, a mirror 71b for reflecting the first probe pulses 13a to the PBS 75 and an actuator, for example a piezo actuator 71c, to control the difference of distance Δs (that affects the time difference Δt and phase difference Δφ) between a second light path 78 in the second probe pulse unit 72. The second probe pulse unit 72 includes the second probe path 78 for conditioning the second probe pluses 13b which includes a waveplate 72a, a mirror 72b for reflecting the second probe pulses 13b to the PBS 75 and an actuator, for example a piezo actuator 72c to control the difference of distance Δs. The output interface 74 includes an output path 79, which includes mirrors 74a and 74b and other optical elements, for guiding the first probe light pulses 13a and the second probe light pulses 13b overlapped by the PBS75 as the hybrid (paired or combined) probe pulses 13.

The first probe path 77 and/or second probe path 78 include a path to control the difference of distance Δs to another path by controlling the mirror 71b and/or 72b using the actuator 71c and/or 72c under the control of the phase controller 56t to set the time difference (delay time) Δt to the first probe pulses 13a (to the Stokes pulses 11 and the pump pulses 12) and vary the phase difference Δφ between the first and the second probe pulses 13a and 13b. The generator 70, by using polarization optic, can provide fast repeatable modulation. This generator 70 includes the two pathways 77 and 78 with adjustable relative delay selected by polarization. Waveplate 76 may be a rotation stage or Electro optic modulator (EOM) for fast (>kHz) modulation. Fast modulation promises reduced noise, removing drift of power, alignment, potential etaloning etc., and increasing scanning speed for generating CARS images.

In this probe pulse generator 70, the waveplate 76 for controlling the polarization of input probe light pulse 30b may have a function for a unit that controls a ratio of the first probe light pulses 13a to the second probe light pulses 13b. That is, the Waveplate 76 is used at a setting somewhere between 0 and 90°. This allows to have different intensities in path 77 for the first probe pulses 13a or path 78 for the second probe pulses 13b (and thus have different intensities of the LO signal (nr signal) and the CARS signal). In the probe pulse generator (conditioner) 70, a polarizer is set to transmit s-polarization only and makes sure that the pulses have clean polarization at s-polarized (same as pump and Stokes) after exiting this setup. In this embodiment, the input probe pulses 30b are p-polarized and output of first and second probe pulses 13a and 13b are s-polarized in order to have the same polarization of the Stokes light pulses 11 and the pump light pulses 12. But such configuration is one of examples of this invention. For example, the waveplate 76 may be set to (for example) 22.5°. When the polarization before the PBS 75 is linear at 45°, 50% of the pulse goes in one path (arm) 77 and another 50% goes in the other path (arm) 78. After the PBS 75, it still has 50% s and p-polarization. Since there is no way of simultaneously rotating it back at the same time to have the same polarization, the polarizer may cut off the part that is not effective. In the example with 22.5° WP setting, the s-polarization will become +45° linear polarization, and the p-polarization will become −45° polarization. The polarizer then cuts off all the p-polarization components to have two clean s-polarization pulses. The ration and how much is cut off changes with the setting of WP 75.

As shown in FIG. 10, by the hybrid probe light pulses 13 which have a first probe light pulses 13a and the second probe light pulses 13b partially overlapped each other, the CARS signals (usual CARS signals) 16a which have resonant feature and NR and the LO signals (INR signals) 16b which have only NR and non-resonant feature are synchronously generated. Therefore, in this system 1, the target CARS spectrums 15 generated by the interference between usual CARS signals 16a and LO 16b can be obtained.

FIG. 11 illustrates the process by which the first probe light pulses 13a are generated in the probe pulse generator 70. FIG. 12 depicts signals for CARS generating with the first probe light pulses 13a using the time-frequency map. FIG. 13 illustrates the process by which the second probe light pulses 13b are generated in the probe pulse generator 70. FIG. 14 depicts signals for CARS generating with the second probe light pulses 13b using the time-frequency map.

The original probe light pulses 30b supplied from the laser source 30 are fed to choose between two optical paths 77 and 78 depending on the direction of polarization. The optical path length difference of the optical paths 77 and 78 is controlled to change probe delay Δt and the phase difference Δφ.

In one embodiment, the phases of the first probe pulses 13a may be modulated to shift the phase Δφ between the first probe pulses 13a and the second probe pulses 13b by (−π/2) and (+π/2). For signal detection (the heterodyne signal detection) on this system 1, to make the phase difference Δφ periodically is the most important. Therefore, the probe pulse generator 70 may change the phase either of the first probe pulses 13a or the second probe pulses 13b, or both. The equation explained later says that it does not matter but the second probe light pulses 13b with the negative delay Δtn for generating LO (nr) may be the one to modify the phase because there are no resonances and thus less change in the signal when adding time delay. It should be noted that since the changing the phase is performed by using a small time-delay, it should be so small that it should not matter to select any of the above. In principle, the phase change can be added to path 77 or path 78 while the other one is fixed for better control and simplicity.

Generally, the modulation frequency should be as high as possible. But the modulation frequency may be selected taking the following conditions into account. Since the modulation in the probe pulse generator 70 may be implemented by using a piezo (but there might be other/better ways of achieving a fast phase modulation), the piezo actuator needs some time to react and move, which is in the order of milliseconds. When we switch between two fixed positions, we need to wait until the piezo has reached the steady position. So, the max. frequency usable is limited to roughly 100 Hz or so. But improvements are possible.

Another point is the signal intensity. For the system 1 working with very low concentrations, it is needed to keep the detector noise low. To do that, adjusting the integration time is required so that the detector 50 is well filled to 80% or so (in that case, mostly shot noise is important, not read out noise etc.). So, the signal intensity determines the integration time, e.g., 50 us in one of embodiments of the systems. The fastest possible switching frequency would then be chosen so that only one spectrum is acquired per phase if modulation that quickly is possible. Using a different detector should be possible but then again the frequency is limited by how fast we can modulate the phase. In summary, if there is a way to modulate the phase with much higher rates with an electro-optic modulator for example and if several fast highly sensitive photodetectors instead of a CCD camera is applicable, in principle, the modulation frequency may go to MHz. It should be noted that the merit of this detection method can be achieved even if he modulation frequency is somewhere between 1 Hz-1 kHz.

FIG. 15 illustrates the process by which the resonant constituents 17 are extracted from the sets of CARS spectrums 15 that include two-types of cars spectrum 15x and 15y generated by the hybrid probe light pulses 13x and 13y respectively. FIG. 16 illustrates waveform examples of two types of cars spectrum 15x and 15y and the resonant constituents 17 obtained by the simulation. As shown in FIG. 15(a), by changing the phases of the second probe light pulses 13b to φ1 and 2 with controlling the voltage of piezo actuator 72c in the second probe light path 78, sets of hybrid probe light pulses 13x and 13y with different phase differences Δφ such as plus and minus Pi/2 ((+/−)π/2) are generated and supplied. As shown in FIG. 15(b), by the sets of hybrid probe light pulses 13x and 13y, the sets of CARS spectrums 15 including the CARS spectrums 15x (phase 1, LO 16b+usual CARS signal 16a) and the CARS spectrums 15y (phase 2, LO 16b−usual CARS signal 16a) are generated. As shown in FIG. 15(c), by calculating the differences between the sets of CARS spectrums 15 with referring the phase differences Δφ, the resonance constituents (resonance features) 17 are extracted.

Instead of, or together with the piezo actuator 72c in the second probe light path 78, the piezo actuator 71c in the first probe light path 77 may be controlled. By scanning the voltage of the piezo actuator 71, the path length of path 77 is changed and the phase of the first probe light pulses 13a. This changes the phase differences Δφ between the phase of the LO 13b and thus the final detected interference signal 15 can be obtained. Piezo modulation may require synchronization between voltage change and camera or detector acquisition of CARS spectrum 15x and 15y.

FIG. 17 shows theoretical backgrounds of this Inter Heterodyne method. As shown in FIG. 17 (a), resonance and non-resonance contributions show different phase (and polarization) properties. Thus, resonance and non-resonance electrical fields have different phases, but phase information is lost at detection. By using Heterodyne detection where overlapping signal with a coherent reference beam (Local Oscillation, LO) for interferometric detection, the different phase relationships can be exploited to measure amplitude and phase of signal or to separate real and imaginary parts of $X^{(3)}$. In the heterodyne term of the signal on detector $S_{Het}$ (ω), by measuring at the phase differences Δφ that are plus and minus Pi/2, as shown in FIG. 17(b), and subtracting, the constant and cosine terms can be eliminated and the imaginary parts of $X^{(3)}$ can be extracted.

FIG. 18 shows relationships of the scan probe phase Δφ (FIG. 18(a)) and the intensities of the sets of CARS spectrums 15x and 15y obtained using the hybrid probe pulses 13 with different phases Δφ (FIGS. 18(b) to (f)). According to the intensities of signals shown in FIGS. 18(b) to (f), as expected, the maximum extracted signal is achieved subtracting spectra at phase difference of +/−Pi/2 (FIG. 18(d)).

FIG. 19 illustrates another embodiment of the probe pulse generator 70. The generator 70 includes: a waveplate 65 for converting polarization of input probe light pulses 30b; at least one birefringent crystal 66 for separating the first probe light pulses 13a and the second probe light pulses 13b from the input probe pulses 30b and including a time difference Δφ between the first probe light pulses 13a and the second probe light pulses 13b; an EOM (electro optic modulator) 67 for modulating at least one of the first light probe pulses 13a and the second probe light 13b to control the phase differences Δφ between the first probe light pulses 13a and the second probe light pulses 13b; and an output path 79 guiding the first probe light pulses 13a and the second probe light pulses 13b overlapped by a polarizing element such as a waveplate and a polarizing plate 68 or a PBS. In this generator 70, single input pulse 30b is converted to double pulses 13a and 13b, one on each axis of birefringent crystal 66 and has delay about 2.5-3 ps. The delay can be adjustable when an additional birefringent wedge pair is used. The birefringent wedge pair is preferable for fine controlling the delay. The phase modulation Δφ between the two pulses 13a and 13b is controlled by using the EOM (electro optic modulator) 67 electrically.

FIG. 20 is a flow diagram showing an overview of the process of the inter heterodyne detection method. The method includes acquiring sets of CARS spectrum (step 81) and extracting resonance constituents (resonance components, resonant features) by comparing the sets of CARS spectrum acquired (step 82). In step 81, the sets of CARS spectrum 15 are acquired by irradiating a part 5*a* of a target 5 with the Stokes light pulses 11, the pump light pulses 12, and the hybrid probe light pulses 13 varying the phases of the hybrid probe light pulses 13. The hybrid probe light pulses 13 include first probe light pulses 13*a* and second probe light pulses 13*b*. The first probe light pulses 13*a* and the second probe light pulses 13*b* overlap in time in part, and the first probe light pulses 13*a* and second probe light pulses 13*b* partially overlap with the Stokes light pulse 11 and the pump light pulse 12 while varying phases of at least one of the first probe light pulses 13*a* and the second probe light pulses 13*b*.

In step 81, the second probe light pulses 13*b* are selected to generate local oscillation (LO) signals 16*b* with the Stokes light pulses 11 and the pump light pulses 12, and the first probe light pulses 13*a* are selected to generate signals 16*a* including resonance constituents with the Stokes light pulses 11 and the pump light pulses 12. The pulse widths PW2 of the first and second probe light pulses 13*a* and 13*b* may be larger than pulse widths PW1 of the Stokes light pulses 11 and the pump light pulses 12, and in the step 81, the hybrid probe light pulses 13 may be emitted so that the first probe light pulses 13*a* have a first relative temporal relationship Δt1 to the Stokes light pulses 11 and the pump light pulses 12 to partially overlap within the pulse widths PW2 of the first probe light pulses 13*a* and the second probe pulses 13*b* have a second relative temporal relationship Δt2, which has a negative delay Δtn relative to the first relative temporal relationship Δt1, to the Stokes light pulses 11 and the pump light pulses 12 to partially overlap within the pulse widths PW2 of the second probe pulses 13*b*.

In step 81, the hybrid probe light pulses 13 may be emitted so that the second probe light pulses 13*b* are emitted earlier than the pulses of Stokes light 11 and the pump light 12. In step 81, the hybrid probe light pulses 13 may be emitted so that the Stokes light pulses 11, the pump light pulses 12 and the first probe light pulses 13 effectively at the same time, and the Stokes light pulses 11 and the pump light pulses 12 effectively at the end of the pulse widths PW2 of the second probe light pulses 13*b*.

When using the probe pulse generator 70 shown in FIG. 9, the step 81 may include: (i) converting polarization of input probe light pulses 30*b* using the waveplate 76; (ii) separating the first probe light pulses 13*a* and the second probe light pulses 13*b* from the input probe pulses 30*b* using the PBS 75; (iii) conditioning the first light probe pulses 13*a* and the second probe light pulses 13*b* by the first probe path 77 and the second probe path 78 respectively; and (iv) guiding the first probe light pulses 13*a* and the second probe light pulses 13*b* overlapped by the PBS 75 as the hybrid probe pulses 13. At least one of the first probe path 77 and the second probe path 78 may include a path to include a time difference to another path and an actuator to move the mirror for modulating.

When using the probe pulse generator 70 shown in FIG. 19, the step 81 may include: (i) converting polarization of input probe light pulses 30*b* using a waveplate 65; (ii) separating the first probe light pulses 13*a* and the second probe light pulses 13*b* from the input probe pulses 30*b* and including a time difference between the first probe light pulses 13*a* and the second probe light pulses 13*b* using at least one birefringent crystal 66; (iii) modulating at least one of the first light probe pulses 13*a* and the second probe light 13*b* using EOM 67; and (iv) guiding the first probe light pulses 13*a* and the second probe light pulses 13*b* overlapped by a polarizing element 68 as the hybrid probe light pulses 13.

The method may further include a step of scanning the target 5 (step 83). In the step 83, the targe 5 is scanned with the Stokes light pulses 11, the pump light pulses 12, and the hybrid probe light pulses 13 to acquire the sets of CARS spectrum 15 at each pixel to generate an image of the target 5. The step 83 may be the 3D scanning to acquire the sets of CARS spectrum 15 at each voxel to generate a 3D image of the target 5. In step 84, the above steps may be repeated until all pixel or voxel information is obtained.

By focusing the laser light on a sample, for example a liquid solution in a cuvette, the CARS spectrum is generated so that it can be analyzed to identify different molecules or even be quantitative to determine concentrations of a solution. In contrast to other methods like fluorescence or Raman spectroscopy, in CARS and other nonlinear methods, the signal is only generated at the focus position. At high focusing, intrinsic spatial resolution is achieved, and the signal is generated only from a tiny volume in the order of 1 µm³. Instead of measuring liquid solutions in a cuvette, however, one can directly apply CARS to structured materials like tissue. The system 1 can scan over the samples by the beam 11, 12 and 13 to provide a spectrum at each different position, which make it possible to generate an image. The system 1 can be applied as a CARS spectroscopy also as a CARS microscopy by scanning and getting a spectrum at each pixel to form an image. For thin samples (targets) 5, signals can be recorded in forward direction through the sample or in back-scattered direction for thicker samples. Imaging requires high local concentrations like lipids in a fat cell, for example. By focusing on a small volume containing high local concentrations, peaks stand out from the background.

As explained above the method and the system for adapting the heterodyne detection are provided. The disclosed heterodyne detection (inter heterodyne method, heterodyne internal reference method) is applicable to any kind of CARS measurement including forward and backscattered CARS. The disclosed heterodyne detection can get LO signals from the same sample (target) 5 from which the resonant component 17 to be get by using multiple beams system.

The method and the system described in this specification may be applicable for biochemical and structural characterization of a target of interest of a living subject, particularly for invasive and non-invasive evaluation of the biochemical compositions of a target of interest of a living subject and applications of the same. The method and the system described in this specification may be applicable for all kinds of samples, also simpler samples like solutions independent of biochemistry.

In this specification, a system 1 for detecting CARS signals is disclosed. The system comprises: (i) a first optical path configured to supply one or more types of first light pulses to a target for causing generation of scattered light that contains resonant components; (ii) a probe pulse conditioner (probe pulse generator) configured to supply the first probe light pulses 13*a* and the second probe light pulses 13*b* to the target 5 to generate the scattered light (CARS signal); and (iii) an acquisition unit (analyzer) 56 that generates differences of acquired scattered lights synchronized with the modulation to extract the resonant components. The first probe light pulses 13*a* include a time difference between the second probe light pulses 13*b* and partially overlap in time. At least one of the first probe light pulses 13a and the second probe light pulses 13b is modulated and then overlapped optically to emit as the hybrid probe pulses (paired or combined probe light pulses) 13. By emitting the first light (beam) pulses that include the Stoke light pulses 11 and the pump light pulses 12, the first light pulses overlap the partially overlap of the first and second probe pulses 13a and 13b in time, and the scattered light that contains both the non-resonant components and the modulated resonant components are generated. Therefore, by generating differences of acquired scattered lights synchronized with the modulation, the resonant components can be extracted.

Another aspect disclosed above is a method for detecting CARS signals. The method comprises: supplying one or more types of first light pulses to a target for causing generation of scattered light that contains resonant components; supplying first probe light pulses and second probe light pulses to the target to generate the scattered light; and generating differences of acquired scattered lights synchronized with the modulation to extract the resonant components. The first probe light pulses include a time difference between the second probe light pulses and partially overlap in time. At least one of the first probe light pulses and the second probe light pulses is modulated and then overlapped optically. And the first light pulses are emitted to overlap the partially overlap of the first and the second probe pulses in time.

The method may further comprise emitting the first light pulses, the first probe light pulses and the second probe light pulses to the target and acquiring scattered lights from the target. The method may further comprise scanning at least a part of the target with the first light pulses, the first probe light pulses and the second probe light pulses and acquiring scattered lights from the target. The step of supplying the first light pulses may include: supplying Stokes light pulses with a first range of wavelengths; and supplying pump light pulses with a second range of wavelengths shorter than the first range of wavelengths so that the pump light pulses overlap in time with the Stokes light pulses, and the first probe pulses and the second probe pulses both have a third range of wavelengths shorter than the second range of wavelengths. The method may further comprise acquiring CARS signal from the target. The method may further comprise acquiring time decays of the resonant components of CARS signal from the target.

Yet another aspect of this invention is a computer program (computer program product) for a computer to operate a device. The device comprises: a first optical path configured to supply one or more types of first light pulses to a target for causing generation of scattered light that contains resonant components; a probe pulse conditioner configured to supply first probe light pulses and second probe light pulses to the target to generate the scattered light; and an acquisition unit for acquiring scattered lights from the target. The computer program includes executable codes for performing steps of: supplying the first probe light pulses and the second probe pulses so as to include a time difference between the first probe light pulses and the second probe light pulses with partially overlap in time, and at least one of the first probe light pulses and the second probe light pulses is modulated and then overlapped optically; and generating differences of acquired scattered lights synchronized with the modulation to extract the resonant components.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A method comprising:
acquiring sets of CARS spectrum by irradiating a part of a target with Stokes light pulses, pump light pulses and hybrid probe light pulses including first probe light pulses and second probe light pulses, wherein the first probe light pulses and the second probe light pulses overlap in time in part, and wherein the first and second probe light pulses partially overlap with the Stokes light pulse and the pump light pulse, while varying phases of at least one of the first probe light pulses and the second probe light pulses; and
extracting resonance constituents by comparing the sets of CARS spectrum acquired.

2. The method according to claim 1, wherein the second probe light pulses are selected to generate local oscillation (LO) signals with the Stokes light pulses and the pump light pulses, and the first probe light pulses are selected to generate signals including resonance constituents with the Stokes light pulses and the pump light pulses.

3. The method according to claim 1, wherein pulse widths of the first and second probe light pulses are larger than pulse widths of the Stokes light pulses and the pump light pulses, and
the acquiring the sets of CARS spectrum includes emitting the hybrid probe light pulses so that the first probe light pulses have a first relative temporal relationship to the Stokes light pulses and the pump light pulses to partially overlap within the pulse widths of the first probe light pulses and the second probe pulses have a second relative temporal relationship, which has a negative delay relative to the first relative temporal relationship, to the Stokes light pulses and the pump light pulses to partially overlap within the pulse widths of the second probe pulses.

4. The method according to claim 1, wherein the acquiring the sets of CARS spectrum includes emitting the hybrid probe light pulses so that the second probe light pulses are emitted earlier than the pulses of Stokes light and the pump light.

5. The method according to claim 1, wherein the acquiring the sets of CARS spectrum includes emitting the hybrid probe light pulses so that the Stokes light pulses, the pump light pulses and the first probe light pulses effectively at a same time and the Stokes light pulses and the pump light pulses effectively at an end of the pulse widths of the second probe light pulses.

6. The method according to claim 1, further comprising scanning the target with the Stokes light pulses, the pump light pulses, and the hybrid probe light pulses to acquire the sets of CARS spectrum at any one of each pixel and each voxel.

7. The method according to claim 1, wherein the Stokes light pulses have first range of wavelengths, the pump light pulses have second range of wavelengths that is shorter than the first range of wavelengths, and the hybrid probe light pulses have third range of the wavelengths that is shorter than the second range of wavelengths.

8. The method according to claim 1, wherein the Stokes light pulses have broadband Stokes beams.

9. The method according to claim 1, wherein the acquiring the sets of CARS spectrum includes:
   converting polarization of input probe light pulses using a waveplate;
   separating the first probe light pulses and the second probe light pulses from the input probe pulses using a PBS;
   conditioning the first light probe pulses and the second probe light pulses by a first probe path and a second probe path respectively, wherein the first probe path and the second probe path respectively include waveplates, mirrors for reflecting light pulses to the PBS, and at least one of the first probe path and the second probe path includes a path to include a time difference to another path and an actuator to move the mirror for modulating; and
   guiding the first probe light pulses and the second probe light pulses overlapped by the PBS.

10. The method according to claim 1, wherein the acquiring the sets of CARS spectrum includes:
    converting polarization of input probe light pulses using a waveplate;
    separating the first probe light pulses and the second probe light pulses from the input probe pulses and including a time difference between the first probe light pulses and the second probe light pulses using at least one birefringent crystal;
    modulating at least one of the first light probe pulses and the second probe light using EOM (electro optic modulator); and
    guiding the first probe light pulses and the second probe light pulses overlapped by a polarizing element.

11. A system comprising:
    an optical path configured to irradiate a part of a target with Stokes light pulses, pump light pulses and hybrid probe light pulses including first probe light pulses and second light pulses, with the first probe light pulses and the second probe light pulses overlapping in time in part, with the first and second probe light pulses partially overlapping with the Stokes pulse and the pump pulse, and with at least one of the first probe light pulses and the second probe light pulses varying phases; and
    a detector configured to detect CARS spectrum generated by the Stokes light pulses, the pump light pulses and the hybrid probe light pulses to acquire sets of CARS spectrum in association with the phases of the hybrid probe light pulses.

12. The system according to claim 11, further comprising a probe pulse generator that is configured to generate the hybrid probe light pulses that include the first probe light pulses and the second probe light pulses with a negative delay to the first probe light pulses.

13. The system according to claim 12, wherein the probe pulse generator is configured to generate the hybrid probe light pulses so that the second probe light pulses are emitted earlier than the pulses of Stokes light and the pump light.

14. The system according to claim 12, wherein the probe pulse generator is configured to generate the hybrid probe light pulses so that the first probe light pulses are emitted with the Stokes light pulses and the pump light pulses effectively at a same time and the second probe light pulses are emitted so that the Stokes light pulses and the pump light pulses are emitted effectively at an end of the pulse widths of the second probe light pulses.

15. The system according to claim 11, further comprising a probe pulse generator that includes a first probe pulse conditioner that is configured to generate the first probe light pulse that have pulse widths larger than pulse widths of the Stokes light pulses and the pump light pulses and a first relative temporal relationship to the Stokes light pulses and the pump light pulses to partially overlap within the pulse widths of the first probe light pulses; and
   a second probe pulse conditioner that is configured to generate the second probe pulse that have pulse widths larger than pulse widths of the Stokes light pulses and the pump light pulses and a second relative temporal relationship, which has a negative delay relative to the first relative temporal relationship, to the Stokes light pulses and the pump light pulses to partially overlap within the pulse widths of the second probe pulses.

16. The system according to claim 11, further comprising a probe pulse generator that includes:
    a waveplate for converting polarization of input probe light pulses;
    a PBS for separating the first probe light pulses and the second probe light pulses from the input probe pulses;
    a first probe path and a second probe path for conditioning respectively the first light probe pulses and the second probe light pulses, wherein the first probe path and the second probe path respectively include waveplates, mirrors for reflecting light pulses to the PBS, and at least one of the first probe path and the second probe path includes a path to include a time difference to another path and an actuator to move the mirror for modulating; and
    an output path for guiding the first probe light pulses and the second probe light pulses overlapped by the PBS.

17. The system according to claim 11, further comprising a probe pulse generator that includes:
    a waveplate for converting polarization of input probe light pulses;
    at least one birefringent crystal for separating the first probe light pulses and the second probe light pulses from the input probe pulses and including a time difference between the first probe light pulses and the second probe light pulses;
    an EOM for modulating at least one of the first light probe pulses and the second probe light; and
    an output path guiding the first probe light pulses and the second probe light pulses overlapped by a polarizing element.

18. The system according to claim 11, wherein the optical path includes:
    a first optical path configured to supply the stokes light pulses with first range of wavelengths;
    a second optical path configured to supply the pump light pulses with second range of wavelengths that is shorter than the first range of wavelengths; and
    a third optical path configured to supply the hybrid probe light pulses with third range of the wavelengths that is shorter than the second range of wavelengths.

19. The system according to claim 18, wherein the first optical path includes a first optical element for generating broadband Stokes beams from the pump light pulses.

20. The system according to claim 11, further comprising a scanner that is configured to scan the target with the Stokes light pulses, the broadband pump light pulses and the hybrid probe light pulses to acquire the sets of CARS spectrum at any one of each pixel and each voxel.

21. The system according to claim 11, further comprising an analyzer that is configured to extract resonance constituents by comparing the sets of CARS spectrum acquired.

22. A nontransitory computer readable medium encoded with a computer program for a computer to operate the system according to claim 11, wherein the computer program includes instructions for controlling the system to acquire the sets of CARS spectrum and extracting resonance constituents by comparing the sets of CARS spectrum acquired.

\* \* \* \* \*